US011535765B2

(12) United States Patent
Egawa et al.

(10) Patent No.: US 11,535,765 B2
(45) Date of Patent: Dec. 27, 2022

(54) AQUEOUS INK

(71) Applicant: KAO CORPORATION, Tokyo (JP)

(72) Inventors: Tsuyoshi Egawa, Izumiotsu (JP); Kaname Mitsuyoshi, Kinokawa (JP); Shimpei Nishimura, Izumiotsu (JP)

(73) Assignee: KAO CORPORATION, Tokyo (JP)

( * ) Notice: Subject to any disclaimer, the term of this patent is extended or adjusted under 35 U.S.C. 154(b) by 254 days.

(21) Appl. No.: 16/756,037

(22) PCT Filed: Oct. 15, 2018

(86) PCT No.: PCT/JP2018/038296
§ 371 (c)(1),
(2) Date: Apr. 14, 2020

(87) PCT Pub. No.: WO2019/078151
PCT Pub. Date: Apr. 25, 2019

(65) Prior Publication Data
US 2020/0248013 A1 Aug. 6, 2020

(30) Foreign Application Priority Data
Oct. 16, 2017 (JP) .............................. JP2017-200635

(51) Int. Cl.
| C09D 11/037 | (2014.01) |
| C09D 11/326 | (2014.01) |
| C09D 11/322 | (2014.01) |
| C09D 11/03 | (2014.01) |
| B41M 5/00 | (2006.01) |
| B41J 2/01 | (2006.01) |

(52) U.S. Cl.
CPC .............. *C09D 11/037* (2013.01); *B41J 2/01* (2013.01); *B41M 5/00* (2013.01); *C09D 11/03* (2013.01); *C09D 11/322* (2013.01); *C09D 11/326* (2013.01)

(58) Field of Classification Search
CPC .. B41J 2/01; B41M 5/00; C09D 11/03; C09D 11/037; C09D 11/322; C09D 11/326
See application file for complete search history.

(56) References Cited

U.S. PATENT DOCUMENTS

| 6,538,047 | B1 | 3/2003 | Miyabayashi |
| 6,923,854 | B2 | 8/2005 | Taguchi et al. |
| 7,291,212 | B2 * | 11/2007 | Taguchi ............... C09D 11/328 106/31.43 |
| 2003/0097961 | A1 | 5/2003 | Yatake et al. |
| 2004/0189765 | A1 * | 9/2004 | Taguchi ................ C09D 11/38 347/100 |
| 2006/0189713 | A1 | 8/2006 | Herrmann et al. |
| 2007/0266890 | A1 | 11/2007 | Taguchi et al. |
| 2008/0165237 | A1 | 7/2008 | Yamauchi et al. |
| 2009/0035468 | A1 | 2/2009 | Matsuyama et al. |
| 2010/0022700 | A1 | 1/2010 | Shibatani et al. |
| 2011/0102529 | A1 | 5/2011 | Yoshida et al. |
| 2013/0342620 | A1 | 12/2013 | Fujie et al. |
| 2014/0066550 | A1 | 3/2014 | Shigemori et al. |
| 2015/0118494 | A1 | 4/2015 | Vilner et al. |
| 2015/0291819 | A1 | 10/2015 | Mizutani et al. |
| 2019/0284410 | A1 | 9/2019 | Azuma et al. |

FOREIGN PATENT DOCUMENTS

| CN | 101245205 A | 8/2008 |
| CN | 104470992 A | 3/2015 |
| EP | 2105476 A2 | 9/2009 |
| EP | 2623567 A1 | 8/2013 |
| EP | 2865531 A1 | 4/2015 |
| EP | 3447098 A1 | 2/2018 |
| JP | 11-152424 A | 6/1999 |
| JP | 2002-161223 A | 6/2002 |
| JP | 2006-225654 A | 8/2006 |
| JP | 2007-91909 A | 4/2007 |
| JP | 2007-98661 A | 4/2007 |
| JP | 2010-43149 A | 2/2010 |
| JP | 2010-168579 A | 8/2010 |
| JP | 3169526 U | 8/2011 |
| JP | 2012-201710 A | 10/2012 |
| JP | 2014-205767 A | 10/2014 |
| JP | 2017-119845 A | 7/2017 |
| JP | 2017-155092 A | 9/2017 |
| JP | 2018-109095 A | 7/2018 |
| WO | WO 01/94482 A1 | 12/2001 |
| WO | WO 2006/129476 A1 | 12/2006 |
| WO | WO 2009/025287 A1 | 2/2009 |
| WO | WO 2014/155842 A1 | 10/2014 |
| WO | WO 2016/066531 A1 | 5/2016 |

OTHER PUBLICATIONS

Extended European Search Report, dated Jul. 2, 2021, for European Application No. 18866080.5.
Gong et al., "Nomenclature of Organic Compounds," Higher Education Press, 1982, 4 pages total.
International Search Report (PCT/ISA/210) issued in PCT/JP2018/038296, dated Dec. 11, 2018.
International Search Report for PCT/JP2018/038295 (PCT/ISA/210) dated Jan. 8, 2019.

(Continued)

*Primary Examiner* — Anh T Vo
(74) *Attorney, Agent, or Firm* — Birch, Stewart, Kolasch & Birch, LLP

(57) ABSTRACT

The present invention relates to [1] a water-based ink containing an azomethine metal complex pigment (A), an aromatic group-containing polymer (B), an organic solvent (D) and water, in which a mass ratio of the azomethine metal complex pigment (A) to the aromatic group-containing polymer (B) [(A)/(B)] is not less than 1.4 and not more than 4, and the aromatic group-containing polymer (B) is a crosslinked polymer obtained by crosslinking an aromatic group-containing polymer (b) having an acid value of not less than 80 mgKOH/g and not more than 400 mgKOH/g with a water-insoluble polyfunctional epoxy compound (c), said water-based ink being excellent in storage stability and maintenanceability, and [2] a process for producing a pigment water dispersion liquid of particles of the aromatic group-containing polymer (B) containing the azomethine metal complex pigment (A).

14 Claims, No Drawings

(56) References Cited

OTHER PUBLICATIONS

Exlended European Search Report for European Application No. 18867470.9, dated Jun. 18, 2021.
U.S. Appl. No. 16/756,084, filed Apr. 14, 2020.

\* cited by examiner

AQUEOUS INK

FIELD OF THE INVENTION

The present invention relates to a water-based ink and a process for producing a pigment water dispersion liquid.

BACKGROUND OF THE INVENTION

As a water-based ink for ink-jet printing, there are known those inks using a pigment. Although it is expected that the inks using a pigment exhibit excellent water resistance and light fastness, there tends to occur such a problem that the inks cause clogging of ejection nozzles owing to flocculation and precipitation of the pigment. To solve the problem, the method of dispersing the pigment in an aqueous medium using a polymer dispersant has been performed. However, it has been still demanded to stably disperse the pigment in the water-based ink for a long period of time, i.e., provide such a water-based ink for ink-jet printing in the form of a pigment-dispersing system which exhibits excellent storage stability.

In particular, it has been highly required that the water-based ink using a yellow pigment as a colorant thereof exhibits good storage stability, from the viewpoint of realizing a wide range of colors of images upon full color printing or attaining good hue of images, etc., upon mixing the yellow color ink with other color inks.

However, the inks using an inorganic yellow pigment have failed to well meet this requirement. Therefore, it has been expected to develop a water-based ink for ink-jet printing using an organic yellow pigment which suffers from a less change in its properties and can exhibit satisfactorily high printing quality. Several proposals have been conventionally made to provide such a water-based ink.

For example, WO 2001/094482A (Patent Literature 1) discloses an ink set for ink-jet printing which is capable of providing high-quality printed images and is excellent in storage stability, and is constituted of a combination of black, yellow, magenta and cyan inks each containing at least a colorant prepared by incorporating a pigment in a polymer, a penetrant and water. In Examples of the Patent Literature 1, there was used the ink containing the colorant 2-B prepared by incorporating C.I. Pigment Yellow 150 in a crosslinked polymer having an acid value as low as about 60 mgKOH/g.

JP 2012-201710A (Patent Literature 2) discloses a pigment yellow ink for ink-jet printing as an ink that is excellent in printability, ejection stability, storage stability, etc., which contains C.I. Pigment Yellow 150, a water-soluble solvent such as diols, etc., water and a pigment-dispersing polymer, in which the pigment-dispersing polymer is an uncrosslinked copolymer containing a (meth)acrylate ester, a styrene-based monomer and (meth)acrylic acid.

SUMMARY OF THE INVENTION

The present invention relates to [1] a water-based ink containing an azomethine metal complex pigment (A), an aromatic group-containing polymer (B), an organic solvent (D) and water, in which a mass ratio of the azomethine metal complex pigment (A) to the aromatic group-containing polymer (B) [(A)/(B)] is not less than 1.4 and not more than 4, and the aromatic group-containing polymer (B) is a crosslinked polymer obtained by crosslinking an aromatic group-containing polymer (b) having an acid value of not less than 80 mgKOH/g and not more than 400 mgKOH/g with a water-insoluble polyfunctional epoxy compound (c).

DETAILED DESCRIPTION OF THE INVENTION

The conventional water-based inks for ink-jet printing which contain a pigment-dispersing polymer dispersant and a water-soluble organic solvent have been improved in rub fastness and image quality of the resulting printed images to some extent. However, in the case where the inks are adhered onto a nozzle surface and suffer from increase in viscosity thereof or the inks adhered to the nozzle surface are dried and solidified thereon, there tends to occur such a problem that the inks are deteriorated in not only storage stability, but also maintenanceability, because they are poor in redispersibility that shows a capability of redispersing the inks suffering from increase in viscosity or being adhered to the nozzle surface in a fresh ink subsequently supplied. If the inks are deteriorated in maintenanceability, there tend to occur such a problem that the number of wiping-off operations required in the maintenance step increases, and a liquid-repellent film provided on a surface of an ink-jet print head tends to be readily deteriorated.

For example, yellow-based water-based inks for ink-jet printing using C.I. Pigment Yellow 74 as a monoazo pigment which is dispersed in the inks with a polymer dispersant are free of problems concerning storage stability and maintenanceability. However, if C.I. Pigment Yellow 150 as an azomethine metal complex pigment is used in the yellow-based water-based inks for the purpose of improving color expression or heat resistance of the obtained printed materials, etc., even though the pigment is dispersed with the same polymer dispersant, there tends to sometimes occur such a problem that the water-based inks using the C.I. Pigment Yellow 150 suffer from increased viscosity or flocculation owing to atomization of the pigment, or are deteriorated in storage stability and maintenanceability.

However, in the aforementioned Patent Literatures 1 and 2 using C.I. Pigment Yellow 150, there are no descriptions concerning the maintenanceability.

The present invention relates to a water-based ink containing an azomethine metal complex pigment which is excellent in storage stability and maintenanceability, and a process for producing a pigment water dispersion liquid.

The present inventors have found that the aforementioned conventional problems can be solved by a water-based ink containing an azomethine metal complex pigment, an aromatic group-containing polymer, an organic solvent and water in which a mass ratio of the azomethine metal complex pigment to the aromatic group-containing polymer falls within a specific range, and the aromatic group-containing polymer is a specific crosslinked polymer.

That is, the present invention relates to the following aspects [1] and [2].

[1] A water-based ink containing an azomethine metal complex pigment (A), an aromatic group-containing polymer (B), an organic solvent (D) and water, in which:

a mass ratio of the azomethine metal complex pigment (A) to the aromatic group-containing polymer (B) [(A)/(B)] is not less than 1.4 and not more than 4; and the aromatic group-containing polymer (B) is a crosslinked polymer obtained by crosslinking an aromatic group-containing polymer (b) having an acid value of not less than 80 mgKOH/g and not more than 400 mgKOH/g with a water-insoluble polyfunctional epoxy compound (c).

[2] A process for producing a pigment water dispersion liquid of particles of an aromatic group-containing polymer (B) containing an azomethine metal complex pigment (A), said process including the following steps 1 and 3:

Step 1: subjecting a mixture containing the azomethine metal complex pigment (A), an aromatic group-containing polymer (b) having an acid value of not less than 80 mgKOH/g and not more than 400 mgKOH/g and water to dispersion treatment to obtain a pigment water dispersion liquid; and Step 3: subjecting the pigment water dispersion liquid obtained in the step 1 to crosslinking treatment with a water-insoluble polyfunctional epoxy compound (c) to obtain a pigment water dispersion liquid B in which the azomethine metal complex pigment (A) is incorporated in the aromatic group-containing polymer (B) obtained by the crosslinking treatment.

In accordance with the present invention, it is possible to provide a water-based ink containing an azomethine metal complex pigment that is excellent in storage stability and maintenanceability, and a process for producing a pigment water dispersion liquid.

Incidentally, the term "maintenanceability" as used herein means that an ink used for ink-jet printing can be prevented from suffering from defects owing to increased viscosity, adhesion, etc., and therefore can exhibit long service life.

[Water-Based Ink]

The water-based ink of the present invention is such a water-based ink that contains an azomethine metal complex pigment (A), an aromatic group-containing polymer (B), an organic solvent (D) and water (hereinafter also referred to merely as an "ink"), in which:

a mass ratio of the azomethine metal complex pigment (A) to the aromatic group-containing polymer (B) [(A)/(B)] is not less than 1.4 and not more than 4; and the aromatic group-containing polymer (B) is a crosslinked polymer obtained by crosslinking an aromatic group-containing polymer (b) having an acid value of not less than 80 mgKOH/g and not more than 400 mgKOH/g with a water-insoluble polyfunctional epoxy compound (c).

Incidentally, the term "water-based ink" as used in the present specification means an ink containing at least 30% by mass of water in which the water preferably has a largest content among components of a medium for dispersing a pigment in the ink.

In addition, the term "printing" as used herein means a concept that includes printing or typing for printing characters or images, and the term "printed material" as used herein means a concept that includes printed matters or typed materials on which the characters or images are printed.

The water-based ink of the present invention is excellent in storage stability and maintenanceability, notwithstanding that the azomethine metal complex pigment is used therein. The reason why the aforementioned advantageous effect can be attained by the present invention is considered as follows though it is not clearly determined yet.

That is, since the azomethine metal complex pigment (A) has a larger electrostatic interaction with each other than that of C.I. Pigment Yellow 74 as a monoazo pigment, it is considered that the azomethine metal complex pigment (A) exhibits higher flocculability or aggregability in the water-based ink than the C.I. Pigment Yellow 74 that has been generally used for the water-based ink. For this reason, it is considered that if the concentration of the pigment in the water-based ink is increased and the pigment is atomized from the standpoint of improving optical density of the water-based ink, etc., the water-based ink tends to suffer from increased viscosity or formation of flocculated foreign matters in association with increase in specific surface area of the pigment. To solve these problems, it is considered that an amount of a polymer dispersant used in the water-based ink is increased according to the increase in specific surface area of the pigment. However, if the amount of the polymer dispersant used in the water-based ink is increased, the water-based ink tends to suffer from increase in viscosity thereof. Therefore, it is not possible to simply increase the amount of the polymer dispersant contained in the water-based ink.

In consequence, it is considered that by using the aromatic group-containing polymer (B) as the polymer dispersant and allowing the polymer dispersant to exhibit a high acid value under such a condition that a mass ratio of the pigment (A) to the polymer dispersant [pigment (A)/polymer dispersant] is large to impart good electrostatic repulsion properties to the respective pigment particles, and further by dispersing the pigment with the crosslinked polymer dispersant, the polymer dispersant is hardly desorbed from the pigment (A) after once being adsorbed thereonto, so that it is possible to improve dispersibility of the pigment particles, reduce the particle sizes of the pigment particles, improve storage stability of the resulting water-based ink, and suppress formation of flocculated foreign matters in the water-based ink. Therefore, the water-based ink can be enhanced in maintenanceability.

In addition, since the water-insoluble polyfunctional epoxy compound (c) is present in the vicinity of a surface of the pigment (A), the crosslinking reaction of the aromatic group-containing polymer is allowed to proceed, so that the aromatic group-containing polymer (B) can be improved in water insolubility. As a result, it is considered that as compared to the case where a water-soluble crosslinking agent is used, the obtained aromatic group-containing polymer (B) is more hardly desorbed from the pigment (A), so that the water-based ink can exhibit excellent storage stability even when the water-based ink to be stored contains an ink vehicle such as an organic solvent, etc.

<Azomethine Metal Complex Pigment (A)>

The azomethine metal complex pigment (A) used in the present invention (hereinafter also referred to as a "pigment (A)" or merely as a "pigment") is in the form of a yellow-based metal complex pigment having an azomethine structure in a molecule thereof. The water-based ink containing the pigment (A) is also preferred from the viewpoint of improving heat resistance of the resulting printed material.

Examples of the pigment (A) include metal complex pigments containing an azomethine compound as a ligand and a divalent or trivalent ion of a metal selected from the group consisting of Fe, Co, Ni and Zn, such as C.I. Pigment Yellow 117, C.I. Pigment Yellow 129, C.I. Pigment Yellow 150, C.I. Pigment Yellow 153, etc. Specific examples of the divalent or trivalent metal ion include $Fe^{2+}$, $Fe^{3+}$, $Co^{2+}$, $Co^{3+}$, $Ni^{2+}$ and $Zn^{2+}$.

The pigment (A) is preferably a metal complex pigment containing a cyclic azomethine compound represented by the following general formula (1) or a tautomer thereof as a ligand of the metal complex.

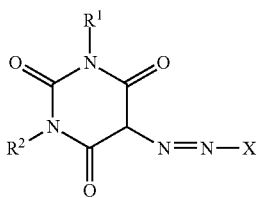

(1)

In the general formula (1), X is a monovalent aromatic hydrocarbon group having 1 to 20 carbon atoms or a group containing a 5- or 6-membered nitrogen-containing heterocyclic ring: $R^1$ and $R^2$ are each independently a hydrogen atom, a monovalent hydrocarbon group having 1 to 5 carbon atoms or a —$SO_3H$ group.

The pigment (A) is preferably a metal complex pigment having a structure represented by the following general formula (2) or a tautomer thereof.

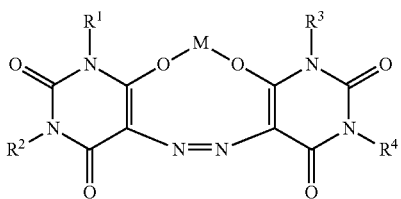

(2)

In the general formula (2), M is a divalent or trivalent ion of a metal selected from the group consisting of Fe, Co, Ni and Zn. Specific examples of the divalent or trivalent metal ion include divalent or trivalent metal ions selected from the group consisting of $Fe^{2+}$, $Fe^{3+}_{2/3}$, $Co^{2+}$, $Co^{3+}_{2/3}$, $Ni^{2+}$ and $Zn^{2+}$.

In the general formula (2). $R^1$ to $R^4$ are each independently a hydrogen atom, a monovalent hydrocarbon group having 1 to 5 carbon atoms or a —$SO_3H$ group.

Among the aforementioned pigments (A), from the viewpoint of improving storage stability and maintenanceability of the resulting water-based ink, more preferred is an azobarbituric acid nickel complex pigment represented by the following formula (3), i.e., C.I. Pigment Yellow 150.

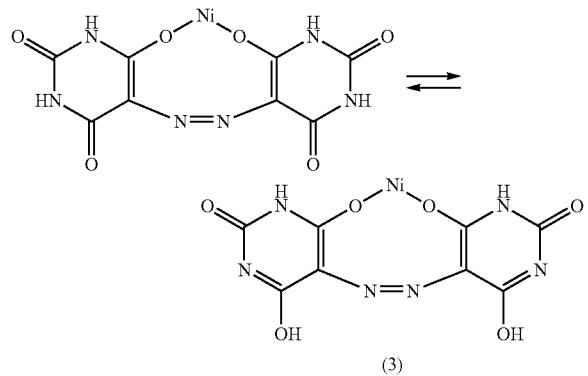

(3)

The aforementioned pigments (A) may be used alone or in the form of a mixture or a solid solution of any two or more kinds thereof. The configuration of the pigment may be either a dry pigment having a powder shape, a granular shape or a bulky shape, or a wet cake or a slurry.

In addition, the pigment (A) may also be used in combination with a known or ordinary yellow pigment that is usually used in the ink-jet printing applications, if required, unless the objects and advantageous effects of the present invention are adversely affected thereby.

In the present invention, the pigment (A) may be contained in the water-based ink in the form of the pigment that is dispersed with the aromatic group-containing polymer (B), or in the form of the aromatic group-containing polymer (B) containing the pigment, i.e., in the form of water-insoluble polymer particles formed by allowing the aromatic group-containing polymer (B) to adhere onto a surface of the pigment (A).

From the viewpoint of improving storage stability of the resulting water-based ink while maintaining good water resistance thereof the pigment (A) is preferably contained in the water-based ink in the form of aromatic group-containing polymer (B) particles containing the pigment (A) (hereinafter also referred to merely as "pigment-containing polymer particles"), and more preferably in the form of the pigment-containing polymer particles that are crosslinked with the water-insoluble polyfunctional epoxy compound (c).

In this preferred embodiment, the water-based ink contains at least the pigment-containing polymer particles and water, and may further contain an organic solvent, if required.

<Aromatic Group-Containing Polymer (B)>

The water-based ink of the present invention contains the aromatic group-containing polymer (B) as the polymer dispersant.

The aromatic group-containing polymer (B) is a crosslinked polymer obtained by crosslinking an aromatic group-containing polymer (b) having an acid value of not less than 80 mgKOH/g and not more than 400 mgKOH/g with the water-insoluble polyfunctional epoxy compound (c). More specifically, the aromatic group-containing polymer (B) is a polymer as a crosslinked product obtained from the aromatic group-containing polymer (b) having an acid value of not less than 80 mgKOH/g and not more than 400 mgKOH/g and the water-insoluble polyfunctional epoxy compound (c).

The aromatic group-containing polymer (B) used in the present invention is preferably formed in an aqueous medium by dispersing the azomethine metal complex pigment (A) in the aqueous medium under such a condition that carboxy groups of the carboxy group-containing aromatic group-containing polymer (b) are at least partially neutralized, and then subjecting the thus neutralized polymer (b) to crosslinking treatment with the water-insoluble polyfunctional epoxy compound (c).

(Aromatic Group-Containing Polymer (b))

The aromatic group-containing polymer (b) has not only a function as a pigment dispersant that is capable of exhibiting the effect of dispersing the azomethine metal complex pigment (A), but also a function as a fixing agent for fixing the pigment onto a printing medium.

The amount of the carboxy groups contained in the aromatic group-containing polymer (b) may be expressed by an acid value of the aromatic group-containing polymer (b). The acid value of the aromatic group-containing polymer (b) is not less than 80 mgKOH/g, preferably not less than 90 mgKOH/g and more preferably not less than 95 mgKOH/g, and is also not more than 400 mgKOH/g, preferably not more than 380 mgKOH/g, more preferably not more than 360 mgKOH/g and even more preferably not more than 340 mgKOH/g. More specifically, the acid value of the aromatic group-containing polymer (b) as the amount of the carboxy groups contained in the aromatic group-containing polymer (b) is preferably not less than 90 mgKOH/g and not more than 400 mgKOH/g, more preferably not less than 90 mgKOH/g and not more than 380 mgKOH/g, even more preferably not less than 95 mgKOH/g and not more than 360 mgKOH/g and further even more preferably not less than 95 mgKOH/g and not more than 340 mgKOH/g.

When the acid value of the aromatic group-containing polymer (b) lies within the aforementioned range, the amount of the carboxy groups or the neutralized carboxy groups in the aromatic group-containing polymer (b) is sufficient, and it is therefore possible to ensure good dispersion stability of the pigment (A). In addition, the acid value of the aromatic group-containing polymer (b) which lies within the aforementioned range is also preferred from the viewpoint of attaining good balance between affinity of the aromatic group-containing polymer (B) to an organic solvent, and interaction of the aromatic group-containing polymer (B) with the pigment (A).

The acid value of the aromatic group-containing polymer (b) may be calculated from mass ratios between the respective monomers constituting the aromatic group-containing polymer (b). In addition, the acid value of the aromatic group-containing polymer (b) may also be determined by the method in which the polymer is dissolved in or swelled with an adequate organic solvent (e.g., MEK) and then the resulting solution or swelled product is subjected to titration.

Examples of the configuration of the aromatic group-containing polymer (B) obtained by crosslinking the aromatic group-containing polymer (b) with the water-insoluble polyfunctional epoxy compound (c) which is present in the resulting water-based ink include (i) the configuration in which the polymer is adsorbed onto the pigment, (ii) the configuration in which the pigment is enclosed (encapsulated) in the polymer, and (iii) the configuration in which the pigment is not adsorbed to the polymer. In the present invention, from the viewpoint of improving dispersion stability of the pigment as well as storage stability of the resulting water-based ink, the aromatic group-containing polymer (B) is preferably present with the configuration (i) or (ii), and more preferably present with the configuration (ii) in which the pigment is enclosed or encapsulated in the polymer.

The aromatic group-containing polymer (b) is preferably in the form of a polymer that is produced by copolymerizing an aromatic group-containing monomer mixture containing (i) an aromatic group-containing monomer (hereinafter also referred to merely as a "component (i)") and (ii) a carboxy group-containing vinyl monomer (hereinafter also referred to merely as a "component (ii)") (such a mixture is hereinafter also referred to merely as a "monomer mixture"). The polymer contains a constitutional unit derived from the component (i) and a constitutional unit derived from the component (ii).

In the aromatic group-containing polymer (b), in addition to the aforementioned components (i) and (ii), (iii) a nonionic monomer (hereinafter also referred to merely as a "component (iii)"), etc., may also used as a monomer component thereof, if required.

[(i) Aromatic Group-Containing Monomer]

The aromatic group-containing monomer (i) is used as a monomer component of the aromatic group-containing polymer (b) from the viewpoint of improving dispersion stability of the pigment-containing polymer particles in the resulting water-based ink.

The aromatic group-containing monomer is preferably a vinyl monomer containing an aromatic group having 6 to 22 carbon atoms which may also contain a substituent group containing a hetero atom, and more preferably a styrene-based monomer, an aromatic group-containing (meth)acrylate or a styrene-based macromonomer.

Specific examples of the styrene-based monomer include styrene, alkyl styrenes such as α-methyl styrene, β-methyl styrene, 2,4-dimethyl styrene, α-ethyl styrene, α-butyl styrene, α-hexyl styrene, etc., halogenated styrenes such as 4-fluorostyrene, 3-chlorostyrene, 3-bromostyrene, etc., 3-nitrostyrene, 4-methoxystyrene, vinyl toluene, divinyl benzene, and the like. Among these styrene-based monomers, preferred are styrene and α-methyl styrene.

Specific examples of the preferred aromatic group-containing (meth)acrylate include phenyl (meth)acrylate, benzyl (meth)acrylate, phenoxyethyl (meth)acrylate and the like. Among these aromatic group-containing (meth)acrylates, more preferred is benzyl (meth)acrylate.

The styrene-based macromonomer is in the form of a compound containing a polymerizable functional group at one terminal end thereof and having a number-average molecular weight of not less than 500 and not more than 100,000. The polymerizable functional group bonded to one terminal end of the styrene-based macromonomer is preferably an acryloyloxy group or a methacryloyloxy group and more preferably a methacryloyloxy group.

The number-average molecular weight of the styrene-based macromonomer is preferably not less than 1,000, more preferably not less than 2,000 and even more preferably not less than 3,000, and is also preferably not more than 10,000, more preferably not more than 9,000 and even more preferably not more than 8,000. Meanwhile, the number-average molecular weight may be the value measured by gel permeation chromatography using chloroform containing 1 mmol/L of dodecyl dimethylamine as a solvent and using polystyrenes as a reference standard substance.

Specific examples of commercially available products of the styrene-based macromonomer include "AS-6(S)", "AN-6(S)" and "HS-6(S)" (tradenames) all available from Toagosei Co., Ltd., etc.

The aforementioned aromatic group-containing monomers may be used alone or in combination of any two or more thereof. As the combination of the aforementioned monomers, preferred is a combination of the styrene-based monomer or the aromatic group-containing (meth)acrylate, and the styrene-based macromonomer, more preferred is a combination of the styrene-based monomer and the styrene-based macromonomer, and even more preferred is a combination of styrene and the styrene-based macromonomer.

[(ii) Carboxy Group-Containing Vinyl Monomer]

The carboxy group-containing vinyl monomer (ii) is used as a monomer component of the aromatic group-containing polymer (b) from the viewpoint of improving dispersion stability of the pigment-containing polymer particles in the water-based ink.

As the carboxy group-containing vinyl monomer, there may be used carboxylic acid monomers. Examples of the carboxylic acid monomers include acrylic acid, methacrylic acid, α-ethyl acrylic acid, crotonic acid, α-methyl crotonic acid, α-ethyl crotonic acid, isocrotonic acid, itaconic acid, maleic acid, fumaric acid, citraconic acid, mesaconic acid, glutaconic acid, 2-methacryloyloxymethylsuccinic acid and the like. Among these carboxylic acid monomers, preferred is at least one monomer selected from the group consisting of acrylic acid and methacrylic acid.

[(iii) Nonionic Monomer]

From the viewpoint of improving dispersion stability of the pigment-containing polymer particles in the water-based ink, the nonionic monomer (iii) may also be used as a monomer component of the aromatic group-containing polymer (b), if required.

Examples of the nonionic monomer include 2-hydroxyethyl (meth)acrylate, 3-hydroxypropyl (meth)acrylate, polyalkylene glycol (meth)acrylates such as polypropylene glycol (n=2 to 30 wherein n represents an average molar number of addition of oxyalkylene groups: hereinafter defined in the same way) (meth)acrylate, polyethylene glycol (n=2 to 30) (meth) acrylate, etc., alkoxy polyalkylene glycol (meth)acrylates such as methoxy polyethylene glycol (n=1 to 30) (meth)acrylate, etc., phenoxy (ethylene glycol/propylene glycol copolymer) (n=1 to 30 in which n for ethylene glycol is 1 to 29) (meth)acrylate, and the like. Among these nonionic monomers, preferred are polypropylene glycol (n=2 to 30) (meth)acrylate and phenoxy (ethylene glycol/propylene glycol copolymer) (meth)acrylate, and more preferred is polypropylene glycol (n=2 to 30) (meth) acrylate.

Meanwhile, the term "(meth)acrylate" as used herein means at least one compound selected from the group consisting of an acrylate and a methacrylate, and the term "(meth)" is hereinafter also defined in the same way.

Specific examples of commercially available products of the nonionic monomer include "NK ESTER M-20G", "NK ESTER M-40G", "NK ESTER M-90G", "NK ESTER M-230G" and the like all available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800". "BLEMMER PP-1000" and the like, "BLEMMER AP-150", "BLEMMER AP-400", "BLEMMER AP-550" and the like, and "BLEMMER 50PEP-300". "BLEMMER 50POEP-800B". "BLEMMER 43PAPE-600B" and the like all available from NOF Corporation, etc.

The aromatic group-containing polymer (b) used in the present invention may also contain a constitutional unit(s) derived from the other monomer(s) than the aforementioned monomers unless the objects and advantageous effects of the present invention are adversely affected by inclusion thereof.

Examples of the other monomer(s) include alkyl (meth) acrylates having 1 to 22 carbon atoms and preferably 6 to 18 carbon atoms, such as methyl (meth)acrylate, 2-ethylhexyl (meth)acrylate, etc., hydroxyalkyl (meth)acrylates such as 2-hydroxyethyl (meth)acrylate, 3-hydroxypropyl (meth) acrylate, etc., and silicone-based macromonomers such as organopolysiloxanes containing a polymerizable functional group at one terminal end thereof, etc.

The aforementioned monomer components may be respectively used alone or in the form of a mixture of any two or more thereof.

(Contents of Respective Components in Monomer Mixture or Contents of Respective Constitutional Units in Polymer)

The contents of the aromatic group-containing monomer (i), the carboxy group-containing vinyl monomer (ii), and the nonionic monomer (iii) as an optional component which may be contained in the monomer mixture, if required (contents of non-neutralized components; hereinafter defined in the same way) upon production of the aromatic group-containing polymer (b), i.e., the contents of the constitutional units derived from the respective components (i), (ii) and (iii) in the aromatic group-containing polymer (b) are as follows, from the viewpoint of improving affinity of the aromatic group-containing polymer (b) to the azomethine metal complex pigment (A) as well as from the viewpoint of improving storage stability of the resulting water-based ink.

The content of the aromatic group-containing monomer (i) is preferably not less than 30% by mass, more preferably not less than 40% by mass and even more preferably not less than 50% by mass, and is also preferably not more than 80% by mass, more preferably not more than 70% by mass and even more preferably not more than 65% by mass.

In addition, in the case where the styrene-based macromonomer is included as the component (i), the styrene-based macromonomer is preferably used in combination with the other monomer(s) such as the styrene-based monomer and/or the aromatic group-containing (meth)acrylate, etc. The content of the styrene-based macromonomer is preferably not less than 5% by mass, more preferably not less than 10% by mass and even more preferably not less than 12% by mass, and is also preferably not more than 40% by mass, more preferably not more than 30% by mass and even more preferably not more than 20% by mass.

The content of the carboxy group-containing vinyl monomer (ii) is preferably not less than 5% by mass, more preferably not less than 8% by mass and even more preferably not less than 10% by mass, and is also preferably not more than 60% by mass, more preferably not more than 50% by mass and even more preferably not more than 45% by mass.

The mass ratio of the component (ii) to the component (i) [component (ii)/component (i)] is preferably not less than 0.1, more preferably not less than 0.15 and even more preferably not less than 0.20, and is also preferably not more than 1.0, more preferably not more than 0.9 and even more preferably not more than 0.8.

In the case where the nonionic monomer (iii) is included, the content of the nonionic monomer (iii) is preferably not less than 10% by mass, more preferably not less than 15% by mass and even more preferably not less than 20% by mass, and is also preferably not more than 45% by mass, more preferably not more than 40% by mass and even more preferably not more than 30% by mass.

In addition, in the case where the components (i), (ii) and (iii) are included, the mass ratio of the component (ii) to a sum of the component (i) and the component (iii) [component (ii)/[component (i)+component (iii)]] is preferably not less than 0.03, more preferably not less than 0.05 and even more preferably not less than 0.10, and is also preferably not more than 0.5, more preferably not more than 0.4 and even more preferably not more than 0.3.

(Production of Aromatic Group-Containing Polymer (b))

The aromatic group-containing polymer (b) may be produced by copolymerizing the aforementioned monomer mixture by known polymerization methods such as a bulk polymerization method, a solution polymerization method, a suspension polymerization method and an emulsion polymerization method, etc. Among these polymerization methods, preferred is the solution polymerization method.

The solvent used in the solution polymerization method is not particularly limited, and is preferably an organic polar solvent. If the organic polar solvent is miscible with water, the organic solvent may be used in the form of a mixture with water. Examples of the organic polar solvents include aliphatic alcohols having 1 to 3 carbon atoms; ketones having 3 to 5 carbon atoms; ethers; and esters such as ethyl acetate, etc. Among these organic polar solvents, preferred is methanol, ethanol, acetone, methyl ethyl ketone or a mixed solvent of at least one of these compounds with water, and more preferred is methyl ethyl ketone or a mixed solvent of methyl ethyl ketone and water.

The polymerization may be carried out in the presence of a polymerization initiator or a polymerization chain transfer agent.

Examples of the polymerization initiator include conventionally known radical polymerization initiators, e.g., azo compounds such as 2,2'-azobisisobutyronitrile, 2,2'-azobis (2,4-dimethylvaleronitrile), etc., and organic peroxides such as tert-butyl peroxyoctoate, benzoyl peroxide, etc. The amount of the radical polymerization initiator used in the polymerization reaction is preferably from 0.001 to 5 mol and more preferably from 0.01 to 2 mol per 1 mol of the monomer mixture.

Examples of the polymerization chain transfer agent include conventionally known chain transfer agents, e.g., mercaptans such as octyl mercaptan, 2-mercaptoethanol, etc., thiuram disulfides, and the like.

In addition, the type of a polymerization chain of the monomers polymerized is not particularly limited, and may be any polymerization type selected from a random type, a block type, a graft type, etc. Among these polymerization types, preferred is a random type.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or in an atmosphere of an inert gas such as argon, etc.

After completion of the polymerization reaction, the polymer produced may be isolated from the obtained reaction solution by known methods such as reprecipitation and removal of the solvent by distillation, etc. In addition, the resulting polymer may be purified by removing the unreacted monomers, etc., from the reaction solution by reprecipitation, membrane separation, chromatography, extraction, etc.

In the present invention, as the method of dispersing the pigment (A) with the aromatic group-containing polymer (b), there may be used optional conventionally known methods. However, it is preferred that the below-mentioned water dispersion liquid of the pigment-containing polymer particles is obtained by the dispersing method. From the viewpoint of enhancing productivity of the water dispersion liquid of the pigment-containing polymer particles, the aromatic group-containing polymer (b) is preferably used in the form of an aromatic group-containing polymer (b) solution without removing the organic solvent used in the polymerization reaction therefrom in order to use the organic solvent contained therein as an organic solvent used in the below-mentioned step 1'.

The solid content of the aromatic group-containing polymer (b) solution is preferably not less than 30% by mass and more preferably not less than 40% by mass, and is also preferably not more than 80% by mass and more preferably not more than 75% by mass, from the viewpoint of enhancing productivity of the water dispersion liquid of the pigment-containing polymer particles.

The weight-average molecular weight of the aromatic group-containing polymer (b) used in the present invention is preferably not less than 5,000, more preferably not less than 7,000 and even more preferably not less than 9,000, and is also preferably not more than 80,000, more preferably not more than 70,000 and even more preferably not more than 60,000. When the weight-average molecular weight of the aromatic group-containing polymer (b) lies within the aforementioned range, the polymer has a sufficient adsorption force to the pigment and therefore allows the resulting water-based ink to exhibit good storage stability.

Meanwhile, the weight-average molecular weight of the polymer may be measured by the method described in Examples below.

[Production of Pigment-Containing Polymer Particles]

The aromatic group-containing polymer (B) particles containing the azomethine metal complex pigment (A) (pigment-containing polymer particles) can be efficiently produced in the form of a water dispersion liquid thereof by the process including the following steps 1 and 3. Furthermore, it is preferred that a neutralizing agent is mixed in the step 1.

Step 1: subjecting a mixture containing the azomethine metal complex pigment (A), the aromatic group-containing polymer (b) having an acid value of not less than 80 mgKOH/g and not more than 400 mgKOH/g and water (hereinafter also referred to merely as a "pigment mixture") to dispersion treatment to obtain a pigment water dispersion liquid; and Step 3: subjecting the pigment water dispersion liquid obtained in the step 1 to crosslinking treatment with the water-insoluble polyfunctional epoxy compound (c) to obtain a pigment water dispersion liquid B in which the azomethine metal complex pigment (A) is incorporated in the aromatic group-containing polymer (B) obtained by the crosslinking treatment.

In the preferred embodiment, the aromatic group-containing polymer (B) particles containing the azomethine metal complex pigment (A) (pigment-containing polymer particles) can be efficiently produced in the form of a water dispersion liquid thereof by the process including the following steps 1' to 3', and it is more preferred that a neutralizing agent is mixed in the step 1'.

Step 1': subjecting a mixture containing the azomethine metal complex pigment (A), the aromatic group-containing polymer (b) having an acid value of not less than 80 mgKOH/g and not more than 400 mgKOH/g, an organic solvent and water (pigment mixture) to dispersion treatment to obtain a pigment dispersion liquid;

Step 2': removing the organic solvent from the pigment dispersion liquid obtained in the step 1' to obtain a pigment water dispersion liquid A; and Step 3': subjecting the pigment water dispersion liquid A obtained in the step 2' to crosslinking treatment with the water-insoluble polyfunctional epoxy compound (c) to obtain a pigment water dispersion liquid B in which the azomethine metal complex pigment (A) is incorporated in the aromatic group-containing polymer (B) obtained by the crosslinking treatment.

(Step 1) (Step 1')

The step 1 is the step of subjecting the pigment mixture containing the pigment (A), the aromatic group-containing polymer (b) having an acid value of not less than 80 mgKOH/g and not more than 400 mgKOH/g and water to dispersion treatment to obtain the pigment water dispersion liquid. In addition, the step 1' is the step of subjecting the pigment mixture further containing the organic solvent to dispersion treatment to obtain the pigment water dispersion liquid. In the step 1 and the step 1', the pigment mixture further containing a neutralizing agent, if required, may be subjected to dispersion treatment.

In the following, although the explanation is made concerning the step 1, it can be similarly applied to the step 1'.

The method for producing the aromatic group-containing polymer (b) is the same as described hereinbefore.

In the step 1, it is preferred that the aromatic group-containing polymer (b) is first dissolved in the organic solvent, and then neutralized by the neutralizing agent (step 1').

The organic solvent used for dissolving the aromatic group-containing polymer (b) is not particularly limited, and is preferably a volatile organic solvent having a boiling point of not higher than 150° C. under atmospheric pressure. Examples of the organic solvent include aliphatic alcohols having 1 to 3 carbon atoms, ketones such as acetone, methyl ethyl ketone, diethyl ketone, methyl isobutyl ketone, etc., ethers such as ethyl ether, isopropyl ether, tetrahydrofuran, etc., esters, and the like. Of these organic solvents, from the viewpoints of improving wettability to the pigment, solubility of the aromatic group-containing polymer (b) therein and adsorption of the aromatic group-containing polymer (b) onto the pigment, more preferred are ketones having not less than 4 and not more than 8 carbon atoms, even more preferred are methyl ethyl ketone and methyl isobutyl ketone, and further even more preferred is methyl ethyl ketone.

When the aromatic group-containing polymer (b) is produced by a solution polymerization method, the solvent used in the solution polymerization method may be directly used as such in the step 1.

(Neutralizing Agent)

It is preferred that the carboxyl groups contained in the aromatic group-containing polymer (b) are at least partially neutralized with a neutralizing agent to control an acid value of the polymer from the viewpoint of improving water resistance, storage stability and the like of the resulting water-based ink. In this case, the neutralization is preferably conducted such that the pH value of the resulting pigment water dispersion liquid is controlled to not less than 7 and not more than 11.

The neutralizing agent is preferably an alkali metal hydroxide. Examples of the alkali metal hydroxide include lithium hydroxide, sodium hydroxide, potassium hydroxide and cesium hydroxide. Of these alkali metal hydroxides, preferred are sodium hydroxide and potassium hydroxide. Also, the aromatic group-containing polymer may be previously neutralized.

The neutralizing agent is preferably used in the form of an aqueous neutralizing agent solution from the viewpoint of sufficiently and uniformly accelerating the neutralization of the polymer. From the same viewpoint as described above, the concentration of the aqueous neutralizing agent solution is preferably not less than 3% by mass, more preferably not less than 10% by mass and even more preferably not less than 15% by mass, and is also preferably not more than 50% by mass and more preferably not more than 25% by mass.

The amount of the neutralizing agent added is preferably an amount corresponding to from 0.2 to 1.0 time such an amount of the neutralizing agent as being required to neutralize the whole carboxy groups contained in the aromatic group-containing polymer (b).

The neutralization degree of the carboxy groups of the aromatic group-containing polymer (b) is preferably not less than 20 mol %, more preferably not less than 25 mol % and even more preferably not less than 30 mol %, and is also preferably not more than 80 mol %, more preferably not more than 70 mol % and even more preferably not more than 66 mol %, from the viewpoint of improving water resistance and storage stability of the resulting water-based ink.

The neutralization degree as used herein means the value calculated by dividing a mole equivalent number of the neutralizing agent by a mole equivalent number of the carboxy groups of the aromatic group-containing polymer (b), i.e., a percent ratio (mol %) expressed by the formula of [(mole equivalent number of neutralizing agent)/(mole equivalent number of carboxy groups of aromatic group-containing polymer (b))]. In the present invention, since the neutralization degree is calculated from the mole equivalent number of the neutralizing agent, the neutralization degree will exceed 100 mol % if the neutralization agent is used in an excessively large amount.

In the step 1 or the step 1', as the neutralizing agent, a volatile basic compound may also be used in combination with the alkali metal hydroxide. The volatile basic compound as used herein means an organic amine having a boiling point of not higher than 100° C. under atmospheric pressure. Specific examples of the volatile basic compound include ammonia, trimethylamine, triethylamine and the like. Among these organic amines, ammonia is preferred from the viewpoint of a high volatility thereof.

The amount of the volatile basic compound used is not particularly limited. Although no volatile basic compound may be used in the present invention, if the volatile basic compound is used as the neutralizing agent, the amount of the volatile basic compound used is not less than 10 mol %, preferably not less than mol %, more preferably not less than 25 mol % and even more preferably not less than 30 mol %, and is also preferably not more than 100 mol %, more preferably not more than 90 mol %, even more preferably not more than 80 mol % and further even more preferably not more than 75 mol %.

Upon calculation of the neutralization degree in the present invention, the amount of the alkali metal hydroxide used is included in the calculation thereof, whereas the amount of the volatile basic compound used is excluded from the calculation thereof.

(Contents of Respective Components in Pigment Mixture)

The contents of the respective components in the pigment mixture in the step 1 or the step 1' are as follows from the viewpoint of improving water resistance, storage stability and productivity of the resulting pigment water dispersion liquid.

The content of the pigment (A) in the pigment mixture is preferably not less than 2% by mass, more preferably not less than 3% by mass and even more preferably not less than 5% by mass, and is also preferably not more than 35% by mass, more preferably not more than 30% by mass and even more preferably not more than 20% by mass.

The content of the aromatic group-containing polymer (b) in the pigment mixture is preferably not less than 1.0% by mass, more preferably not less than 2.0% by mass and even more preferably not less than 3.0% by mass, and is also preferably not more than 8.0% by mass, more preferably not more than 7.0% by mass and even more preferably not more than 6.0% by mass.

The content of the organic solvent in the pigment mixture is preferably not less than 5% by mass, more preferably not less than 7% by mass and even more preferably not less than 10% by mass, and is also preferably not more than 35% by mass, more preferably not more than 30% by mass and even more preferably not more than 25% by mass.

The content of water in the pigment mixture is preferably not less than 40% by mass, more preferably not less than 45% by mass and even more preferably not less than 50% by mass, and is also preferably not more than 85% by mass, more preferably not more than 80% by mass and even more preferably not more than 75% by mass.

The mass ratio of the pigment (A) to the aromatic group-containing polymer (b) [pigment (A)/aromatic group-containing polymer (b)] in the pigment mixture is preferably not less than 1.4, more preferably not less than 1.6, even more more preferably not less than 1.8, further even more preferably not less than 2.0 and still further even more preferably not less than 2.2, and is also preferably not more than 4, more preferably not more than 3.8, even more preferably not more than 3.6, further even more preferably not more than 3.4 and still further even more preferably not more than 3.2.

(Dispersion Treatment of Pigment Mixture)

In the step 1 or the step 1', the dispersing method for obtaining the pigment water dispersion liquid or the pigment dispersion liquid is not particularly limited. The pigment particles may be atomized into fine particles having a desired average particle size only by substantial dispersion treatment. However, it is preferred that the pigment mixture is first subjected to preliminary dispersion treatment, and then further subjected to the substantial dispersion treatment by applying a shear stress thereto so as to control the average particle size of the obtained pigment particles to a desired value.

When subjecting the pigment mixture to the preliminary dispersion treatment, there may be employed ordinary mixing and stirring devices such as anchor blades, disper blades, etc. Of these devices, preferred are high-speed stirring mixers.

As a means for applying a shear stress to the pigment mixture in the substantial dispersion treatment, there may be used, for example, kneading machines such as roll mills, kneaders, etc., high-pressure homogenizers such as "MICROFLUIDIZER" available from Microfluidics Corporation, etc., and media-type dispersers such as paint shakers, beads mills, etc. Examples of the commercially available media-type dispersers include "Ultra Apex Mill" available from Kotobuki Industries Co., Ltd., "Pico Mill" available from Asada Iron Works Co., Ltd., and the like. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the high-pressure homogenizer.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the high-pressure homogenizer used in the substantial dispersion treatment is preferably not less than 3 and more preferably not less than 10, and is also preferably not more than 30 and more preferably not more than 25.

(Step 2')

The step 2' is the step of removing the organic solvent from the pigment dispersion liquid obtained in the step 1' if the organic solvent is compounded in the pigment mixture in the step 1', to obtain a pigment water dispersion liquid A.

The removal of the organic solvent may be conducted by conventionally known methods. The organic solvent is preferably substantially completely removed from the thus obtained pigment water dispersion liquid A. However, the residual organic solvent may be present in the pigment water dispersion liquid A unless the objects and advantageous effects of the present invention are adversely affected by the residual organic solvent. The content of the residual organic solvent in the pigment water dispersion liquid A is preferably not more than 0.1% by mass and more preferably not more than 0.01% by mass. In addition, if required, the pigment dispersion liquid may be subjected to heating and stirring treatments before removing the organic solvent therefrom by distillation.

In the thus-obtained pigment water dispersion liquid A, the pigment-containing polymer particles are dispersed in a dispersing medium containing water as a main medium. The configuration of the pigment-containing polymer particles in the pigment water dispersion liquid A is not particularly limited, and the pigment-containing polymer particles may have any configuration as long as the particles are formed of at least the pigment (A) and the aromatic group-containing polymer (b). As described above, the particle configuration in which the pigment (A) is enclosed or encapsulated in the aromatic group-containing polymer (b) is preferred.

The concentration of non-volatile components in the resulting pigment water dispersion liquid A (solid content of the pigment water dispersion liquid A) is preferably not less than 10% by mass, more preferably not less than 15% by mass and even more preferably not less than 20% by mass, and is also preferably not more than 40% by mass, more preferably not more than 35% by mass and even more preferably not more than 30% by mass, from the viewpoint of improving dispersion stability of the pigment water dispersion liquid A as well as from the viewpoint of facilitating preparation of the water-based ink.

Meanwhile, the solid content of the pigment water dispersion liquid A may be measured by the method described in Examples below.

The average particle size of the pigment-containing polymer particles in the pigment water dispersion liquid A is preferably not less than 50 nm, more preferably not less than 60 nm and even more preferably not less than 70 nm, and is also preferably not more than 180 nm, more preferably not more than 160 nm and even more preferably not more than 140 nm, from the viewpoints of suppressing formation of coarse particles and improving ejection stability of the resulting water-based ink.

Meanwhile, the average particle size of the pigment-containing polymer particles may be measured by the method described in Examples below.

(Step 3) (Step 3')

The step 3 is the step of subjecting the pigment water dispersion liquid obtained in the step 1 to crosslinking treatment, and the step 3' is the step of subjecting the pigment water dispersion liquid A obtained in the step 2' to crosslinking treatment. In each of the step 3 and the step 3', the crosslinking treatment is conducted using the water-insoluble polyfunctional epoxy compound (c) to obtain a pigment water dispersion liquid B in which the pigment (A) is incorporated into the aromatic group-containing polymer (B) obtained by the crosslinking treatment.

In this step, the carboxy groups contained in the aromatic group-containing polymer (b) constituting the pigment-containing polymer particles are partially crosslinked to form a crosslinked structure in a surface layer portion of the respective pigment-containing polymer particles. More specifically, the aromatic group-containing polymer (B) according to the present invention is produced from the aromatic group-containing polymer (b) and the water-insoluble polyfunctional epoxy compound (c) on the surface of the pigment.

<Water-Insoluble Polyfunctional Epoxy Compound (c)>

The solubility in water of the water-insoluble polyfunctional epoxy compound (c) used in the present invention as measured by dissolving the epoxy compound in 100 g of water at 20° C. is preferably not more than 50 g, more preferably not more than 40 g and even more preferably not more than 35 g, from the viewpoint of efficiently reacting the epoxy compound with the carboxy groups of the aromatic group-containing polymer (b) in the dispersing medium containing water as a main component.

In addition, from the viewpoint of improving storage stability and maintenanceability of the resulting water-based ink, the water solubility rate of the water-insoluble polyfunctional epoxy compound (c) is preferably not more than 50% by mass, more preferably not more than 40% by mass and even more preferably not more than 35% by mass.

The "water solubility rate" as used herein means a rate (% by mass) of dissolution of the water-insoluble polyfunctional epoxy compound (c) as measured by dissolving 10 parts by mass of the epoxy compound in 90 parts by mass of water at room temperature (25° C.). More specifically, the water solubility rate may be measured by the method described in Examples below.

The water-insoluble polyfunctional epoxy compound (c) is a compound containing two or more epoxy groups in a molecule thereof, preferably a glycidyl ether group-containing compound, and more preferably a glycidyl ether compound of a polyhydric alcohol containing a hydrocarbon group having not less than 3 and not more than 8 carbon atoms.

The molecular weight of the water-insoluble polyfunctional epoxy compound (c) is preferably not less than 120, more preferably not less than 150 and even more preferably not less than 200, and is also preferably not more than 1500, more preferably not more than 1000 and even more preferably not more than 800, from the viewpoint of facilitating the crosslinking reaction and improving storage stability of the resulting crosslinked polymer.

The number of epoxy groups contained in the water-insoluble polyfunctional epoxy compound (c) is preferably from 2 to 6 per a molecule of the epoxy compound, and more preferably from 3 to 6 per a molecule of the epoxy compound, from the viewpoint of efficiently reacting the epoxy compound with the carboxy groups of the polymer to thereby enhance storage stability of the resulting pigment-containing polymer particles, etc. Since the water-insoluble polyfunctional epoxy compounds (c) containing not less than 5 epoxy groups in a molecule thereof are less available in the market, the use of those water-insoluble polyfunctional epoxy compounds (c) containing 3 or 4 epoxy groups in a molecule thereof is more preferable from the viewpoint of meeting both requirements of high reactivity and good cost efficiency.

From the same viewpoint as described above, the epoxy equivalent of the water-insoluble polyfunctional epoxy compound (c) is preferably not less than 100, more preferably not less than 110 and even more preferably not less than 120, and is also preferably not more than 300, more preferably not more than 270 and even more preferably not more than 250.

Specific examples of the water-insoluble polyfunctional epoxy compound (c) include polyglycidyl ethers such as polypropylene glycol diglycidyl ether (water solubility rate: 31% by mass), glycerin polyglycidyl ether, glycerol polyglycidyl ether, polyglycerol polyglycidyl ether, trimethylolpropane polyglycidyl ether (water solubility rate: 27% by mass), sorbitol polyglycidyl ether, pentaerythritol polyglycidyl ether, resorcinol diglycidyl ether, neopentyl glycol diglycidyl ether and hydrogenated bisphenol A-type diglycidyl ethers, and the like. Of these water-insoluble polyfunctional epoxy compounds (c), preferred are trimethylolpropane polyglycidyl ether (water solubility rate: 27% by mass) and pentaerythritol polyglycidyl ether (water-insoluble).

(Crosslinking Reaction)

In the present invention, the carboxy groups contained in the aromatic group-containing polymer (b) are partially neutralized with the neutralizing agent for dispersing the pigment (A) to obtain the pigment water dispersion liquid A. Then, a part of the carboxy groups contained in the aromatic group-containing polymer (b) are further reacted with the water-insoluble polyfunctional epoxy compound (c) to form a crosslinked structure therein, thereby obtaining an aqueous pigment dispersion liquid B in which the pigment (A) is dispersed in an aqueous medium using the aromatic group-containing polymer (B) produced in the reaction system.

The crosslinking reaction between the carboxy groups contained in the aromatic group-containing polymer (b) and the water-insoluble polyfunctional epoxy compound (c) is preferably conducted after dispersing the pigment (A) with the aromatic group-containing polymer (b).

From the same viewpoint as described above, the temperature used in the crosslinking reaction is preferably not lower than 40° C., more preferably not lower than 50° C., even more preferably not lower than 55° C., further even more preferably not lower than 60° C. and still further even more preferably not lower than 65° C., and is also preferably not higher than 95° C. and more preferably not higher than 90° C.

In addition, from the viewpoint of completing the crosslinking reaction and attaining good cost efficiency, the time of the crosslinking reaction is preferably not less than 0.5 hour, more preferably not less than 1 hour, even more preferably not less than 1.5 hours and further even more preferably not less than 3.0 hours, and is also preferably not more than 12 hours, more preferably not more than 10 hours, even more preferably not more than 8.0 hours and further even more preferably not more than 6 hours.

The crosslinking degree of the aromatic group-containing polymer (b) subjected to the crosslinking treatment is preferably not less than 5 mol %, more preferably not less than 10 mol % and even more preferably not less than 15 mol %, and is also preferably not more than 80 mol %, more preferably not more than 70 mol % and even more preferably not more than 60 mol %. The crosslinking degree of the aromatic group-containing polymer (b) is an apparent crosslinking degree calculated by a percent ratio (mol %) of a mole equivalent number of the epoxy groups of the water-insoluble polyfunctional epoxy compound (c) to a mole equivalent number of the carboxy groups of the aromatic group-containing polymer (b) [(mole equivalent number of epoxy groups of water-insoluble polyfunctional epoxy compound (c))/(mole equivalent number of carboxy groups of aromatic group-containing polymer (b))].

The average particle size of the pigment-containing polymer particles in the pigment water dispersion liquid B is preferably not less than 50 nm, more preferably not less than 60 nm and even more preferably not less than 70 nm, and is also preferably not more than 180 nm, more preferably not more than 160 nm and even more preferably not more than 140 nm, from the viewpoints of suppressing formation of coarse particles and improving ejection stability of the resulting water-based ink.

Meanwhile, the average particle size of the pigment-containing polymer particles may be measured by the method described in Examples below.

In addition, the average particle size of the pigment-containing polymer particles in the water-based ink according to the present invention is substantially the same as the average particle size of the pigment-containing polymer particles in the pigment water dispersion liquid B.

The pH value of the pigment water dispersion liquid B is preferably not less than 8.0 and more preferably not less than 8.5. When the pH value of the pigment water dispersion liquid B is not less than 8.0, dissociation of the anionic groups from the polymer is promoted, and the amount of electric charges present in the pigment dispersion liquid is sufficient, so that the resulting pigment dispersion liquid can be enhanced in storage stability. The upper limit of the pH value of the pigment water dispersion liquid B is not particularly limited. However, the pH value of the pigment water dispersion liquid B is preferably not more than 11 and more preferably not more than 10.5 in order to prevent members of a printer or a printing apparatus from being adversely influenced thereby.

The method of measuring the pH value is not particularly limited, and the pH measuring method using a glass electrode as prescribed in JIS Z 8802 is preferably used from the viewpoint of good convenience and high accuracy.

[Production of Water-Based Ink]

The water-based ink of the present invention may be efficiently produced by a process including the following steps 1, 3 and 4, or a process including the following steps 1' to 4', though the production method is not particularly limited thereto.

Step 1: subjecting a mixture containing the azomethine metal complex pigment (A), the aromatic group-containing polymer (b) having an acid value of not less than 80 mgKOH/g and not more than 400 mgKOH/g and water (pigment mixture) to dispersion treatment to obtain a pigment water dispersion liquid;

Step 3: subjecting the pigment water dispersion liquid obtained in the step 1 to crosslinking treatment with the water-insoluble polyfunctional epoxy compound (c) to obtain the pigment water dispersion liquid B in which the azomethine metal complex pigment (A) is incorporated in the aromatic group-containing polymer (B) obtained by the crosslinking treatment; and Step 4: mixing the pigment water dispersion liquid B obtained in the step 3 with an organic solvent (D) to obtain the water-based ink.

Step 1': subjecting a mixture containing the azomethine metal complex pigment (A), the aromatic group-containing polymer (b) having an acid value of not less than 80 mgKOH/g and not more than 400 mgKOH/g, an organic solvent and water (pigment mixture) to dispersion treatment to obtain a pigment dispersion liquid;

Step 2': removing the organic solvent from the pigment dispersion liquid obtained in the step 1' to obtain the pigment water dispersion liquid A:

Step 3': subjecting the pigment water dispersion liquid A obtained in the step 2' to crosslinking treatment with the water-insoluble polyfunctional epoxy compound (c) to obtain the pigment water dispersion liquid B in which the azomethine metal complex pigment (A) is incorporated in the aromatic group-containing polymer (B) obtained by the crosslinking treatment; and Step 4': mixing the pigment water dispersion liquid B obtained in the step 3' with the organic solvent (D) to obtain the water-based ink.

The details of the steps 1 and 3 and the steps 1' to 3' are the same as those described with respect to the steps 1 and 3 and the steps 1' to 3' in the aforementioned paragraph [Production of Pigment-Containing Polymer Particles].

The step 4 is the step of mixing the pigment water dispersion liquid B obtained in the step 3 or the step 3' with the organic solvent (D) to obtain the water-based ink. The dispersing method used in the step 4 is not particularly limited.

<Organic Solvent (D)>

The organic solvent (D) is used from the viewpoint of further improving storage stability of the resulting water-based ink, etc. The organic solvent used above preferably contains one or more organic solvents having a boiling point of not lower than 90° C., and the boiling point of the organic solvent (D) (in terms of a weighted mean value of boiling points of the respective organic solvents contained therein) is preferably not higher than 250° C. The weighted mean value of boiling points of the respective organic solvents contained in the organic solvent (D) is preferably not lower than 150° C. and more preferably not lower than 180° C. from the viewpoint of suppressing adhesion or fixing of the ink, and is also preferably not higher than 245° C., more preferably not higher than 220° C. and even more preferably not higher than 200° C. from the viewpoint of improving an image quality of the resulting printed material.

From the viewpoint of improving an image quality of the resulting printed material, as suitable examples of the aforementioned organic solvent, preferred is at least one organic solvent selected from the group consisting of a polyhydric alcohol and a polyhydric alcohol alkyl ether.

Examples of the polyhydric alcohol include ethylene glycol, diethylene glycol, polyethylene glycol, propylene glycol, dipropylene glycol, polypropylene glycol, 1,3-propanediol, 1,3-butanediol, 1,4-butanediol, 3-methyl-1,3-butanediol, 1,5-pentanediol, 1,6-hexanediol, 2-methyl-2,4-pentanediol, 1,2,6-hexanetriol, 1,2,4-butanetriol, 1,2,3-butanetriol, petriol, etc. In addition, triethylene glycol (boiling point (b.p.) 285° C.), tripropylene glycol (b.p. 273° C.), glycerin (b.p. 290° C.) and the like may be used in combination with the compound having a boiling point lower than 250° C., preferably the compound having a boiling point lower than 230° C. Among these polyhydric alcohols, preferred are ethylene glycol (b.p. 197° C.), propylene glycol (b.p. 188° C.) and diethylene glycol (b.p. 244° C.), and more preferred are ethylene glycol and propylene glycol.

Examples of the polyhydric alcohol alkyl ether include ethylene glycol monoethyl ether, ethylene glycol monobutyl ether, diethylene glycol monomethyl ether, diethylene glycol monoethyl ether, diethylene glycol monoisopropyl ether, diethylene glycol monobutyl ether, triethylene glycol monomethyl ether, triethylene glycol monoisobutyl ether, tetraethylene glycol monomethyl ether, propylene glycol monoethyl ether, dipropylene glycol monobutyl ether, tripropylene glycol monobutyl ether, etc. In addition, triethylene glycol monobutyl ether (b.p. 276° C.) and the like may be used in combination with the compound having a boiling point lower than 250° C., preferably the compound having a boiling point lower than 230° C. Among these polyhydric alcohol alkyl ethers, preferred are diethylene glycol monoisopropyl ether (b.p. 207° C.) and dipropylene glycol monomethyl ether (b.p. 188° C.), and more preferred is diethylene glycol monoisopropyl ether.

The organic solvent may further include the other organic solvent(s) in addition to the aforementioned polyhydric alcohol and polyhydric alcohol alkyl ether. Examples of the other organic solvent(s) include nitrogen-containing heterocyclic compounds, amides, amines, sulfur-containing compounds and the like. These other organic solvents are preferably kept in a liquid state under the environmental condition of 25° C.

The water-based ink of the present invention may contain a plurality of organic solvents. The content of the organic solvents having a boiling point of higher than 250° C. in the organic solvent (D) is preferably less than 10% by mass, more preferably not more than 5% by mass, even more preferably not more than 3% by mass, further even more preferably not more than 1% by mass and still further even more preferably 0% by mass from the viewpoint of improving an image quality of the resulting printed material.

The water-based ink of the present invention may also contain, if required, various additives that may be usually used in ordinary water-based inks, such as a surfactant, a wetting agent, a penetrant, a humectant, a dispersant, a viscosity modifier, a pH controller, a defoaming agent, an antiseptic agent, a mildew-proof agent, a rust preventive, an antioxidant, etc.

(Surfactant)

The surfactant may be added to the water-based ink in order to control properties of the ink such as a surface tension, etc. Examples of the surfactant include an anionic surfactant, a nonionic surfactant, a cationic surfactant and an amphoteric surfactant. Of these surfactants, preferred are an anionic surfactant and a nonionic surfactant.

Examples of the anionic surfactant include alkylbenzenesulfonic acid salts, alkylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, higher alkyl sulfosuccinic acid salts, polyoxyethylene alkylethercarboxylic acid salts, polyoxyethylene alkylethersulfuric acid salts, alkyl phosphoric acid salts, polyoxyethylene alkyletherphosphoric acid salts, etc.

Examples of the nonionic surfactant include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkyl amines, polyoxyethylene fatty acid amides, fatty acid alkylol amides, alkyl alkanol amides, acetylene glycol, oxyethylene adducts of acetylene glycol, polyethylene glycol/polypropylene glycol block copolymers, etc.

As the other surfactant, there may also be used a silicone-based surfactant such as polysiloxane oxyethylene adducts, a fluorine-based surfactant, etc.

These surfactants may be used alone or in the form of a mixture of any two or more thereof.

The content of the surfactant in the water-based ink is not particularly limited, and is from 0.001 to 3% by mass, preferably from 0.01 to 2% by mass and more preferably from 0.1 to 1.0% by mass.

The contents of the respective components in the water-based ink of the present invention as well as properties of the ink are as follows.

(Content of Azomethine Metal Complex Pigment (A))

The content of the pigment (A) in the water-based ink is preferably not less than 2% by mass, more preferably not less than 2.5% by mass and even more preferably not less than 3% by mass from the viewpoint of enhancing optical density of the water-based ink upon printing, and is also preferably not more than 12% by mass, more preferably not more than 10% by mass, even more preferably not more than 8% by mass and further even more preferably not more than 6% by mass from the viewpoint of reducing viscosity of the water-based ink upon volatilizing the solvent therefrom and improving storage stability of the water-based ink under high-temperature conditions.

(Total Content of Azomethine Metal Complex Pigment (A) and Aromatic Group-Containing Polymer (B))

The total content of the pigment (A) and the aromatic group-containing polymer (B) in the water-based ink is preferably not less than 1.5% by mass, more preferably not less than 1.8% by mass, even more preferably not less than 2.0% by mass and further even more preferably not less than 2.2% by mass, and is also preferably not more than 15% by mass, more preferably not more than 12% by mass, even more preferably not more than 10% by mass and further even more preferably not more than 9% by mass.

The mass ratio of the azomethine metal complex pigment (A) to the aromatic group-containing polymer (B) [(A)/(B)] is not less than 1.4, preferably not less than 1.6, more preferably not less than 1.8, even more preferably not less than 2.0 and further even more preferably not less than 2.2, and is also not more than 4, preferably not more than 3.8, more preferably not more than 3.6, even more preferably not more than 3.4 and further even more preferably not more than 3.2, from the viewpoint of improving storage stability and maintenanceability of the water-based ink. More specifically, the mass ratio [(A)/(B)] is preferably not less than 1.6 and not more than 3.8, more preferably not less than 1.8 and not more than 3.6, even more preferably not less than 2.0 and not more than 3.4, and further even more preferably not less than 2.2 and not more than 3.2 from the viewpoint of improving storage stability and maintenanceability of the water-based ink.

(Content of Organic Solvent (D))

The content of the organic solvent (D) in the water-based ink is preferably not less than 20% by mass, more preferably not less than 30% by mass and even more preferably not less than 35% by mass, and is also preferably not more than 70% by mass, more preferably not more than 60% by mass and even more preferably not more than 55% by mass, from the viewpoint of improving storage stability and maintenanceability of the water-based ink.

The content of propylene glycol in the water-based ink is preferably not less than 10% by mass, more preferably not less than 15% by mass and even more preferably not less than 20% by mass, and is also preferably not more than 60% by mass, more preferably not more than 50% by mass and even more preferably not more than 45% by mass, from the same viewpoint as described above.

(Content of Water)

The content of water in the water-based ink is preferably not less than 30% by mass, more preferably not less than 40% by mass and even more preferably not less than 45% by mass, and is also preferably not more than 80% by mass, more preferably not more than 70% by mass and even more preferably not more than 65% by mass, from the viewpoint of improving storage stability and maintenanceability of the water-based ink.

(Properties of Water-Based Ink)

The viscosity of the water-based ink as measured at 32° C. is preferably not less than 2.0 mPa·s, more preferably not less than 3.0 mPa·s and even more preferably not less than 5.0 mPa·s, and is also preferably not more than 12 mPa·s, more preferably not more than 9.0 mPa·s and even more preferably not more than 7.0 mPa·s, form the viewpoint of improving storage stability of the resulting water-based ink.

The pH value of the water-based ink is preferably not less than 7.0, more preferably not less than 7.2 and even more preferably not less than 7.5 form the viewpoint of further improving storage stability of the resulting water-based ink, and is also preferably not more than 11.0, more preferably not more than 10.0 and even more preferably not more than 9.5 from the viewpoint of improving the resistance of members to the water-based ink and suppressing skin irritation.

The water-based ink of the present invention is excellent in storage stability and capable of providing a good printed material, and therefore can be suitably used as an ink for flexo printing, gravure printing or ink-jet printing. In addition, the water-based ink of the present invention is excellent in maintenanceability when used in an ink-jet printing method, and therefore is preferably used as a water-based ink for ink-jet printing.

The water-based ink of the present invention is loaded to a conventionally known ink-jet printing apparatus from which droplets of the ink are ejected onto a printing medium to print characters or images, etc., on the printing medium.

The ink-jet printing apparatus may be any of a continuous injection type (a charge-controlling type, a spray type, etc.), an on-demand type (a piezoelectric type, a thermal type, an electrostatic attraction type, etc.) and the like. It is more preferred that the water-based ink of the present invention is used as a water-based ink for ink-jet printing using an ink-jet printing apparatus of a piezoelectric type.

Examples of the printing medium usable in the present invention include a high-water absorbing plain paper, a low-water absorbing coated paper and a low-water absorbing film. Specific examples of the coated paper include a versatile glossy coated paper, a multi-color foam glossy coated paper, etc. Specific examples of the film include a polyester film, a polyvinyl chloride film, a polypropylene film, a polyethylene film, etc.

EXAMPLES

In the following Production Examples, Preparation Examples, Examples and Comparative Examples, the "part(s)" and "%" indicate "part(s) by mass" and "% by mass", respectively, unless otherwise specified.

(1) Measurement of Weight-Average Molecular Weight of Aromatic Group-Containing Polymer The weight-average molecular weight of the aromatic group-containing polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min] using a solution prepared by dissolving phosphoric acid (guaranteed reagent) available from FUJIFILM Wako Pure Chemical Corporation and lithium bromide (reagent) available from Tokyo Chemical Industry Co., Ltd., in N,N-dimethylformamide (for high-performance liquid chromatography) available from FUJIFILM Wako Pure Chemical Corporation such that concentrations of phosphoric acid and lithium bromide in the resulting solution were 60 mmol/L and 50 mmol/L, respectively, as an eluent, and using monodisperse polystyrenes having known molecular weights as a reference standard substance.

(2) Calculation of Acid Values of Aromatic Group-Containing Polymers

The acid values of the polymers were calculated from the mass ratios between the monomers constituting the respective polymers.

The acid value of the polymer B1 obtained in Production Example 1 was 104 mgKOH/g as the calculated value.

The acid value of the polymer B2 obtained in Production Example 2 was 327 mgKOH/g as the calculated value.

The acid value of the polymer B3 obtained in Comparative Production Example 1 was 70 mgKOH/g as the calculated value.

(3) Measurement of Solid Content of Pigment Water Dispersion Liquid

Sodium sulfate dried to constant weight in a desiccator was weighed and charged in an amount of 10.0 g into a 30 mL polypropylene container (φ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Measurement of Water Solubility Rate of Polyfunctional Epoxy Compound

A glass tube (25 mmφ in diameter×250 mm in height) was charged with 90 parts by mass of ion-exchanged water and 10 parts by mass of a crosslinking agent at room temperature (25° C.). The glass tube thus charged was allowed to stand for 1 hour in a thermostatic bath controlled to a water temperature of 25° C. Next, the contents of the glass tube were vigorously shaken for 1 minute, and then the glass tube was placed again in the thermostatic bath, followed by allowing the glass tube to stand in the bath for 10 minutes. Then, the mass of undissolved components in the glass tube was measured to calculate a water solubility rate (% by mass) of the crosslinking agent.

(5) Measurement of Average Particle Size of Pigment-Containing Polymer Particles The particles were subjected to cumulant analysis using a laser particle analyzing system "Model No.: ELS-8000" available from Otsuka Electrics Co., Ltd., to measure an average particle size thereof. The measurement was conducted using a dispersion liquid prepared by diluting the dispersion to be measured with water so as to adjust a concentration of the particles in the dispersion to $5\times10^{-3}$% by weight. Also, the measurement was conducted under the conditions including a temperature of 25° C., an angle between incident light and detector of 90° and a cumulative number of 100 times, and a refractive index of water (1.333) was input to the analyzing system as a refractive index of the dispersing medium. The thus measured cumulant average particle size of the particles was defined as an average particle size of the pigment-containing polymer particles.

Preparation of Polymer Dispersant

Production Example 1 (Production of Aromatic Group-Containing Polymer B1 Solution)

The monomers, solvent (methyl ethyl ketone: MEK) and polymerization chain transfer agent (2-mercaptoethanol)

shown in the column "Initially Charged Monomer Solution" in Table 1 were charged into a reaction vessel equipped with two dropping funnels 1 and 2 and mixed with each other, and an inside atmosphere of the reaction vessel was replaced with nitrogen gas, thereby obtaining an initially charged monomer solution.

On the other hand, the monomers, solvent, polymerization initiator "V-65" (tradename; 2,2'-azobis(2,4-dimethylvaleronitrile)) available from FUJIFILM Wako Pure Chemical Corporation and polymerization chain transfer agent shown in the column "Dropping Monomer Solution 1" in Table 1 were mixed with each other to obtain a dropping monomer solution 1. The thus obtained dropping monomer solution 1 was charged into the dropping funnel 1, and an inside atmosphere of the dropping funnel 1 was replaced with nitrogen gas.

dried polymer was then dissolved in water to prepare an aqueous polymer solution having a concentration of $5 \times 10^{-1}\%$ by mass in terms of a solid content thereof. As a result, it was confirmed that the average particle size of the polymer B1 particles in the solution was 89 nm.

Meanwhile, the details of the respective monomers shown in Table 1 were as follows.

Styrene macromer: "AS-6(S)" (number-average molecular weight: 6000; 50% by mass methyl isobutyl ketone solution) available from Toagosei Co., Ltd.

M-40G: Methoxy polyethylene glycol monomethacrylate "NK ESTER M-40G" (average molar number of addition of ethyleneoxide: 4; end group: methoxy group) available from Shin-Nakamura Chemical Co., Ltd.

TABLE 1

| | | Initially charged monomer solution (part(s)) | Dropping monomer solution 1 (part(s)) | Dropping monomer solution 2 (part(s)) |
|---|---|---|---|---|
| (i) Aromatic group-containing monomer | Styrene | 17.6 | 140.8 | 17.6 |
| | Styrene macromer | 12.0 | 108.0 | — |
| (ii) Carboxy group-containing vinyl monomer | Methacrylic acid | — | 51.2 | 12.8 |
| (iii) Nonionic monomer | M-40G | 10.0 | 80.0 | 10.0 |
| Solvent | Methyl ethyl ketone | 6.0 | 66.0 | 48.0 |
| Polymerization initiator | V-65 | — | 3.2 | 0.8 |
| Polymerization chain transfer agent | 2-Mercaptoethanol | 0.08 | 0.56 | 0.16 |

In addition, the monomers, solvent, polymerization initiator and polymerization chain transfer agent shown in the column "Dropping Monomer Solution 2" in Table 1 were mixed with each other to obtain a dropping monomer solution 2. The thus obtained dropping monomer solution 2 was charged into the dropping funnel 2, and an inside atmosphere of the dropping funnel 2 was replaced with nitrogen gas.

In a nitrogen atmosphere, the initially charged monomer solution in the reaction vessel was maintained at 77° C. while stirring, and the dropping monomer solution 1 in the dropping funnel 1 was gradually added dropwise to the reaction vessel over 3 hours. Next, the dropping monomer solution 2 in the dropping funnel 2 was gradually added dropwise to the reaction vessel over 2 hours. After completion of the dropwise addition, the mixed solution in the reaction vessel was stirred at 77° C. for 0.5 hour.

Then, a polymerization initiator solution prepared by dissolving 0.6 part of the aforementioned polymerization initiator "V-65" in 27.0 parts of methyl ethyl ketone was added to the mixed solution in the reaction vessel, and the resulting reaction solution was aged at 77° C. for 1 hour while stirring. The aforementioned procedure including the preparation and addition of the polymerization initiator solution and the aging of the reaction solution was repeated five more times. Then, while maintaining the reaction solution in the reaction vessel at 80° C. for 1 hour, methyl ethyl ketone was added thereto, thereby obtaining a solution of an aromatic group-containing polymer B1 (solid content: 40.8%).

The weight-average molecular weight and the acid value of the thus obtained aromatic group-containing polymer B1 were 52,700 and 104 mgKOH/g, respectively. In addition, the resulting aromatic group-containing polymer B1 was dried to constant weight at 105° C. for 2 hours, and the thus Production Example 2 (Production of Aromatic Group-Containing Polymer B2 Solution Eighty four parts of acrylic acid, 108 parts of styrene and 8 parts of α-methyl styrene were mixed to prepare a monomer mixture solution. Twenty parts of MEK and 0.3 part of 2-mercaptoethanol as a polymerization chain transfer agent as well as 10% of the monomer mixture solution prepared above were charged into a reaction vessel and mixed with each other, and then an inside atmosphere of the reaction vessel was fully replaced with nitrogen gas.

On the other hand, a mixed solution prepared by mixing remaining 90% of the monomer mixture solution, 0.27 part of the aforementioned polymerization chain transfer agent, 60 parts of MEK and 2.2 parts of an azo-based radical polymerization initiator "V-65" was charged into a dropping funnel. In a nitrogen atmosphere, the monomer mixed solution in the reaction vessel was heated to 65° C. while stirring, and then the mixed solution in the dropping funnel was added dropwise thereinto over 3 hours. After the elapse of 2 hours from completion of the dropwise addition while maintaining the mixed solution at 65° C., a solution prepared by dissolving 0.3 part of the aforementioned polymerization initiator in 5 parts of MEK was added to the mixed solution, and the resulting reaction solution was further aged at 65° C. for 2 hours and then at 70° C. for 2 hours to thereby obtain a carboxy group-containing polymer solution (B2) (solid content: 71.0%; weight-average molecular weight of the polymer: 16500; acid value of the polymer: 327 mgKOH/g).

Comparative Production Example 3

Eighteen parts of acrylic acid, 174 parts of styrene and 8 parts of α-methyl styrene were mixed to prepare a monomer mixture solution. The subsequent procedure was conducted in the same manner as in Production Example 2, thereby obtaining a carboxy group-containing polymer solution B3 (weight-average molecular weight of the polymer: 19000; acid value of the polymer: 70 mgKOH/g).

Preparation Example 1 (Preparation of Water Dispersion Liquid 1 of Pigment-Containing Polymer Particles)

(1) The aromatic group-containing polymer B1 solution (solid content: 40.8%) obtained in Production Example 1 and MEK were mixed with each other in amounts of 147.1 g and 119.1 g, respectively, thereby obtaining an MEK solution of the aromatic group-containing polymer B1. The resulting MEK solution of the aromatic group-containing polymer B1 was charged into a 2 L-capacity disper, and while stirring the solution at 1400 rpm, 591.8 g of ion-exchanged water, 16.0 g of a 5N sodium hydroxide aqueous solution and 1.9 g of a 25% ammonia aqueous solution were added thereto such that the degree of neutralization of the aromatic group-containing polymer B1 by sodium hydroxide was adjusted to 60 mol % and the degree of neutralization of the aromatic group-containing polymer B1 by ammonia was adjusted to 25 mol %. The resulting reaction solution was stirred at 2000 rpm for 15 minutes while cooling the solution in a water bath at 0° C.

Then, 180 g of C.I. Pigment Yellow 150 "Bayscript Yellow 4GF" available from LANXESS AG was added to the reaction solution, and the resulting mixture was stirred at 6400 rpm for 1 hour. The resulting pigment mixture was subjected to dispersion treatment by a circulation method using a media disperser "Ultra Apex Mill; Model No.: UAM-1" available from Kotobuki Industries Co., Ltd., packed with 0.05 mm+zirconia beads "YTZ Ball" (as dispersing media particles produced by a granulation method) available from Nikkato Corporation (beads packing rate: 80%) under the conditions of an stirring blade peripheral speed of 12 m/s and a circulation flow rate of 500 mL/min for 2 hours. Next, the thus obtained dispersion was further subjected to high-pressure dispersion treatment under a pressure of 150 MPa using a high-pressure disperser "Microfluidizer" available from Microfluidics Corporation by passing the dispersion through the device 3 times, thereby obtaining a dispersion treatment product. It was confirmed that the solid content of the resulting dispersion treatment product was 23.0% by mass.

(2) A 2 L eggplant-shaped flask was charged with 1000 g of the dispersion treatment product obtained in the above step, and then 533.3 g of ion-exchanged water was added thereto (solid content: 15.0% by mass). The resulting mixture was maintained under a pressure of 0.09 MPa in a warm water bath adjusted to 32° C. for 3 hours using a rotary distillation apparatus "Rotary Evaporator N-1000S" available from Tokyo Rikakikai Co., Ltd., operated at a rotating speed of 50 rpm to remove the organic solvent therefrom. Further, the temperature of the warm water bath was adjusted to 62° C., and the pressure in the apparatus was reduced to 0.07 MPa, and the reaction solution was concentrated under this condition until a solid content of the reaction solution reached 25.0% by mass.

(3) The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 minutes. Thereafter, the resulting liquid layer portion was subjected to filtration treatment through a 5 μm-mesh membrane filter "Minisart" available from Sartorius Inc.

Four hundred grams of the resulting filtrate (C.I. Pigment Yellow 150: 73.5 g; aromatic group-containing polymer B1: 24.5 g) were mixed with 52.42 g of ion-exchanged water and then with 1.37 g of "Ploxel LVS" (mildew-proof agent; active ingredient content: 20%) available from Arch Chemicals Japan, Inc., and further mixed with 2.35 g of trimethylolpropane polyglycidyl ether "DENACOL EX-321" (molecular weight: 302; epoxy equivalent: 140; water solubility rate: 27%) as a crosslinking agent available from Nagase ChemteX Corporation, followed by stirring the resulting mixture at 70° C. for 3 hours (crosslinking degree: 40 mol %). The obtained reaction solution was cooled to 25° C., and then subjected to filtration treatment through the aforementioned 5 μm-mesh filter. Furthermore, the obtained filtered product was mixed with ion-exchanged water so as to adjust a solid content of the resulting dispersion to 22.0% by mass, thereby obtaining a water dispersion liquid 1 of pigment-containing polymer particles (average particle size of the pigment-containing polymer particles: 110 nm).

Preparation Example 2 (Preparation of Water Dispersion Liquid 2 of Pigment-Containing Polymer Particles)

The polymer produced by drying the aromatic group-containing polymer B2 solution (solid content: 71.0%) obtained in Production Example 2 under reduced pressure was weighed in an amount of 58.1 parts, and mixed with 71.5 parts of MEK. Then, 23.6 parts of a 5N sodium hydroxide aqueous solution (sodium hydroxide as solid components: 16.9%; for volumetric titration) available from FUJI FI M Wako Pure Chemical Corporation were further added into the resulting mixed solution to neutralize the polymer such that the ratio of the number of moles of the sodium hydroxide to the number of moles of carboxy groups of the polymer was 40% (neutralization degree: 40 mol %), followed by further adding 695.1 parts of ion-exchanged water thereto. Then, 200 g of the aforementioned C.I. Pigment Yellow 150 "Bayscript Yellow 4GF" was added to the resulting mixture. The thus obtained dispersion was stirred at 20° C. for 60 minutes using a disper "ULTRA DISPER" (tradename) available from Asada Iron Works Co., Ltd., while operating a disper blade thereof at a rotating speed of 7000 rpm.

The resulting pigment mixture was treated using the aforementioned media disperser "UAM-1" in the same manner as in Preparation Example 1(1), thereby obtaining a dispersion treatment product.

(2) A 2 L eggplant-shaped flask was charged with 1000 g of the dispersion treatment product obtained in the above step, and then 666.7 g of ion-exchanged water was added thereto (solid content: 15.0% by mass). The resulting solution was concentrated using the aforementioned rotary evaporator in the same manner as in Preparation Example 1(2) until a solid content of the solution reached 25.0% by mass.

(3) The thus obtained concentrated solution was subjected to filtration treatment in the same manner as in Preparation Example 1(3).

Four hundred grams of the resulting filtrate (C.I. Pigment Yellow 150: 76.0 g; aromatic group-containing polymer B2: 22.1 g) were mixed with 61.61 g of ion-exchanged water, and further mixed with 1.08 g of the aforementioned "Ploxel LVS" (mildew-proof agent) and then with 4.86 g of the aforementioned "DENACOL EX-321L" (crosslinking agent), followed by stirring the resulting mixture at 70° C. for 3 hours (crosslinking degree: 40 mol %). The obtained reaction solution was cooled to 25° C., and then subjected to filtration treatment through the aforementioned 5 µm-mesh filter. Furthermore, the obtained filtered product was mixed with ion-exchanged water so as to adjust a solid content of the resulting mixture to 22.0% by mass, thereby obtaining a water dispersion liquid 2 of pigment-containing polymer particles (average particle size of the pigment-containing polymer particles: 110 nm).

Preparation Example 3 (Preparation of Water Dispersion Liquid 3 of Pigment-Containing Polymer Particles)

The same procedure as in Preparation Example 1 was repeated except that the pigment used in Preparation Example 1 was replaced with C.I. Pigment Yellow 74 "Fast Yellow 7414" available from Sanyo Color Works, Ltd., thereby obtaining a water dispersion liquid 3 of pigment-containing polymer particles (average particle size of the pigment-containing polymer particles: 110 nm).

Preparation Example 4 (Preparation of Water Dispersion Liquid 4 of Pigment-Containing Polymer Particles)

The polymer produced by drying the aromatic group-containing polymer B3 solution (acid value of the polymer: 70 mgKOH/g) obtained in Comparative Production Example 3 under reduced pressure was weighed in an amount of 58.1 parts, and mixed with 70.7 parts of MEK. Then, 6.9 parts of a 5N sodium hydroxide aqueous solution (sodium hydroxide as solid components: 16.9%) available from FUJIFILM Wako Pure Chemical Corporation were further added into the resulting mixed solution to neutralize the polymer such that the ratio of the number of moles of the sodium hydroxide to the number of moles of carboxy groups of the polymer was 40% (neutralization degree: 40 mol %), followed by further adding 701.3 parts of ion-exchanged water thereto. Then, 200 g of the aforementioned C.I. Pigment Yellow 150 "Bayscript Yellow 4GF" was added to the resulting mixture. The thus obtained dispersion was stirred at 20° C. for 60 minutes using the aforementioned "ULTRA DISPER" while operating a disper blade thereof at a rotating speed of 7000 rpm.

The resulting pigment mixture was treated using the aforementioned media disperser "UAM-1" in the same manner as in Preparation Example 1(1), thereby obtaining a dispersion treatment product.

(2) A 2 L eggplant-shaped flask was charged with 1000 g of the dispersion treatment product obtained in the above step, and then 666.7 g of ion-exchanged water was added thereto (solid content: 15.0% by mass). The resulting solution was concentrated using the aforementioned rotary evaporator in the same manner as in Preparation Example 1(2) until a solid content of the solution reached 25.0% by mass.

(3) The thus obtained concentrated solution was subjected to centrifugal separation and then filtration treatment in the same manner as in Preparation Example 1(3).

Four hundred grams of the resulting filtrate (C.I. Pigment Yellow 150: 76.0 g; aromatic group-containing polymer B3: 22.1 g) were mixed with 49.46 g of ion-exchanged water, and further mixed with 1.03 g of the aforementioned "Ploxel LVS" (mildew-proof agent) and then with 1.42 g of the aforementioned "DENACOL EX-321L" (crosslinking agent), followed by stirring the resulting mixture at 70° C. for 3 hours. The obtained reaction solution was cooled to 25° C., and then subjected to filtration treatment through the aforementioned 5 µm-mesh filter. Furthermore, the obtained filtered product was mixed with ion-exchanged water so as to adjust a solid content of the resulting mixture to 22.0% by mass, thereby obtaining a water dispersion liquid 4 of pigment-containing polymer particles (average particle size of the pigment-containing polymer particles: 160 nm).

Preparation Example 5 (Preparation of Water Dispersion Liquid 5 of Pigment-Containing Polymer Particles)

(1) The aromatic group-containing polymer B1 solution (solid content: 40.8%) obtained in Production Example 1 and methyl ethyl ketone (MEK) were mixed with each other in amounts of 223.0 g and 73.6 g, respectively, thereby obtaining an MEK solution of the aromatic group-containing polymer B1. The resulting MEK solution of the aromatic group-containing polymer B1 was charged into a 2 L-capacity disper, and while stirring the solution at 1400 rpm, 582.6 g of ion-exchanged water, 24.2 g of a 5N sodium hydroxide aqueous solution and 2.9 g of a 25% ammonia aqueous solution were added thereto such that the degree of neutralization of the aromatic group-containing polymer B1 by sodium hydroxide was adjusted to 60 mol % and the degree of neutralization of the aromatic group-containing polymer B1 by ammonia was adjusted to 25 mol %. The resulting reaction solution was stirred at 2000 rpm for 15 minutes while cooling the solution in a water bath at 0° C. Then, 147.0 g of the aforementioned C.I. Pigment Yellow 150 "Bayscript Yellow 4GF" was added to the reaction solution, and the resulting mixture was stirred at 6400 rpm for 1 hour. The resulting pigment mixture was subjected to dispersion treatment using the aforementioned media disperser "UAM-1" in the same manner as in Preparation Example 1(1). Next, the thus obtained dispersion was further subjected to high-pressure dispersion treatment under a pressure of 150 MPa using the aforementioned "Microfluidizer" available from Microfluidics Corporation by passing the dispersion through the device 3 times, thereby obtaining a dispersion treatment product.

(2) A 2 L eggplant-shaped flask was charged with 1000 g of the dispersion treatment product obtained in the above step, and then 533.3 g of ion-exchanged water was added thereto (solid content: 15.0% by mass). The resulting solution was concentrated using the aforementioned rotary evaporator in the same manner as in Preparation Example 1(2) until a solid content of the solution reached 25.0% by mass.

(3) The thus obtained concentrated solution was subjected to centrifugal separation and then filtration treatment in the same manner as in Preparation Example 1(3).

Four hundred grams of the resulting filtrate (C.I. Pigment Yellow 150: 60.5 g; aromatic group-containing polymer B1: 37.5 g) were mixed with 56.81 g of ion-exchanged water, and further mixed with 1.39 g of the aforementioned "Ploxel LVS" (mildew-proof agent) and then with 3.59 g of the aforementioned "DENACOL EX-321L" (crosslinking agent), followed by stirring the resulting mixture at 70° C. for 3 hours. The obtained reaction solution was cooled to 25° C., and then subjected to filtration treatment through the aforementioned 5 µm-mesh filter. Furthermore, the obtained filtered product was mixed with ion-exchanged water so as to adjust a solid content of the resulting mixture to 22.0% by mass, thereby obtaining a water dispersion liquid 5 of pigment-containing polymer particles (average particle size of the pigment-containing polymer particles: 110 nm).

Preparation Example 6 (Production of Water Dispersion Liquid 6 of Pigment-Containing Polymer Particles)

The same procedure as in Preparation Example 1 was repeated except that the amounts of ion-exchanged water, the aforementioned "Ploxel LVS" (mildew-proof agent) and the aforementioned "DENACOL EX-321" (crosslinking agent) used in Preparation Example 1(3) were changed to 44.11 g, 1.34 g and 0 g, respectively, thereby obtaining a water dispersion liquid 6 of pigment-containing polymer particles (average particle size of the pigment-containing polymer particles: 115 nm).

Preparation Example 7 (Preparation of Water Dispersion Liquid 7 of Pigment-Containing Polymer Particles)

(1) The aromatic group-containing polymer B1 solution (solid content: 40.8%) obtained in Production Example 1 and MEK were mixed with each other in amounts of 283.0 g and 59.8 g, respectively, thereby obtaining an MEK solution of the aromatic group-containing polymer B1. The resulting MEK solution of the aromatic group-containing polymer B1 was charged into a 2 L-capacity disper, and while stirring the solution at 1400 rpm, 640.5 g of ion-exchanged water, 30.7 g of a 5N sodium hydroxide aqueous solution and 3.7 g of a 25% ammonia aqueous solution were added thereto such that the degree of neutralization of the aromatic group-containing polymer B1 by sodium hydroxide was adjusted to 60 mol % and the degree of neutralization of the aromatic group-containing polymer B1 by ammonia was adjusted to 25 mol %. The resulting reaction solution was stirred at 2000 rpm for 15 minutes while cooling the solution in a water bath at 0° C.

Then, 147.0 g of the aforementioned C.I. Pigment Yellow 150 "Bayscript Yellow 4GF" was added to the reaction solution, and the resulting mixture was stirred at 6400 rpm for 1 hour. The resulting pigment mixture was subjected to dispersion treatment using the aforementioned media disperser "UAM-1" in the same manner as in Preparation Example 1(1). Next, the thus obtained dispersion was further subjected to high-pressure dispersion treatment under a pressure of 150 MPa using the aforementioned "Microfluidizer" available from Microfluidics Corporation by passing the dispersion through the device 3 times, thereby obtaining a dispersion treatment product.

(2) A 2 L eggplant-shaped flask was charged with 1000 g of the dispersion treatment product obtained in the above step, and then 533.3 g of ion-exchanged water was added thereto (solid content: 15.0% by mass). The resulting solution was concentrated using the aforementioned rotary evaporator in the same manner as in Preparation Example 1(2) until a solid content of the solution reached 25.0% by mass.

(3) The thus obtained concentrated solution was subjected to centrifugal separation and then filtration treatment in the same manner as in Preparation Example 1(3).

Four hundred grams of the resulting filtrate (C.I. Pigment Yellow 150: 54.9 g; aromatic group-containing polymer B1: 43.1 g) were mixed with 58.72 g of ion-exchanged water, and further mixed with 1.39 g of the aforementioned "Ploxel LVS" (mildew-proof agent) and then with 4.14 g of the aforementioned "DENACOL EX-321L" (crosslinking agent), followed by stirring the resulting mixture at 70° C. for 3 hours. The obtained reaction solution was cooled to 25° C., and then subjected to filtration treatment through the aforementioned 5 μm-mesh filter. Furthermore, the obtained filtered product was mixed with ion-exchanged water so as to adjust a solid content of the resulting mixture to 22.0% by mass, thereby obtaining a water dispersion liquid 7 of pigment-containing polymer particles (average particle size of the pigment-containing polymer particles: 120 nm).

Preparation Example 8 (Preparation of Water Dispersion Liquid 8 of Pigment-Containing Polymer Particles)

(1) The aromatic group-containing polymer B1 solution (solid content: 40.8%) obtained in Production Example 1 and MEK were mixed with each other in amounts of 73.8 g and 107.9 g, respectively, thereby obtaining an MEK solution of the aromatic group-containing polymer B1. The resulting MEK solution of the aromatic group-containing polymer B1 was charged into a 2 L-capacity disper, and while stirring the solution at 1400 rpm, 438.4 g of ion-exchanged water, 8.0 g of a 5N sodium hydroxide aqueous solution and 1.0 g of a 25% ammonia aqueous solution were added thereto such that the degree of neutralization of the aromatic group-containing polymer B1 by sodium hydroxide was adjusted to 60 mol % and the degree of neutralization of the aromatic group-containing polymer B1 by ammonia was adjusted to 25 mol %. The resulting reaction solution was stirred at 2000 rpm for 15 minutes while cooling the solution in a water bath at 0° C.

Then, 147.0 g of the aforementioned C.I. Pigment Yellow 150 "Bayscript Yellow 4GF" was added to the reaction solution, and the resulting mixture was stirred at 6400 rpm for 1 hour. The resulting pigment mixture was subjected to dispersion treatment using the aforementioned media disperser "UAM-1" in the same manner as in Preparation Example 1(1). Next, the thus obtained dispersion was further subjected to high-pressure dispersion treatment under a pressure of 150 MPa using the aforementioned "Microfluidizer" available from Microfluidics Corporation by passing the dispersion through the device 3 times, thereby obtaining a dispersion treatment product.

(2) A 2 L eggplant-shaped flask was charged with 1000 g of the dispersion treatment product obtained in the above step, and then 533.3 g of ion-exchanged water was added thereto (solid content: 15.0% by mass). The resulting solution was concentrated using the aforementioned rotary evaporator in the same manner as in Preparation Example 1(2) until a solid content of the solution reached 25.0% by mass.

(3) The thus obtained concentrated solution was subjected to centrifugal separation and then filtration treatment in the same manner as in Preparation Example 1(3).

Four hundred grams of the resulting filtrate (C.I. Pigment Yellow 150: 81.3 g; aromatic group-containing polymer B1: 16.7 g) were mixed with 49.76 g of ion-exchanged water, and further mixed with 1.36 g of the aforementioned "Ploxel LVS" (mildew-proof agent) and then with 1.60 g of the aforementioned "DENACOL EX-321L" (crosslinking agent), followed by stirring the resulting mixture at 70° C. for 3 hours. The obtained reaction solution was cooled to 25° C., and then subjected to filtration treatment through the aforementioned 5 μm-mesh filter. Furthermore, the obtained filtered product was mixed with ion-exchanged water so as to adjust a solid content of the resulting mixture to 22.0% by mass, thereby obtaining a water dispersion liquid 8 of pigment-containing polymer particles (average particle size of the pigment-containing polymer particles: 185 nm).

Example 1 (Production of Water-Based Ink)

The water dispersion liquid 1 of the pigment-containing polymer particles containing C.I. Pigment Yellow 150 (solid content: 22% by mass) obtained in Preparation Example 1 was weighed in an amount of 27.93 g, and mixed with 37.50 g of propylene glycol (PG) available from FUJIFILM Wako Pure Chemical Corporation, 10.00 g of diethylene glycol (DEG) available from FUJIFILM Wako Pure Chemical Corporation and 0.05 g of a polyether-modified silicone "SILFACE SAG005" (kinematic viscosity: 170 mm$^2$/s; HLB: 7) available from Nissin Chemical Co., Ltd., and then 24.52 g of ion-exchanged water was added to the resulting mixture so as to adjust a total amount of the mixture to 100 g, thereby obtaining a water-based ink.

Example 2 (Production of Water-Based Ink)

The same procedure as in Example 1 was repeated except that the water dispersion liquid 1 (solid content: 22% by mass) obtained in Preparation Example 1 was replaced with 26.78 g of the water dispersion liquid 2 (solid content: 22% by mass) obtained in Preparation Example 2, and the amounts of propylene glycol available from FUJIFILM Wako Pure Chemical Corporation diethylene glycol available from FUJIFILM Wako Pure Chemical Corporation and ion-exchanged water used therein were changed to 43.00 g, 0 g and 30.17 g, respectively, thereby obtaining a water-based ink.

Example 3 (Production of Water-Based Ink)

The same procedure as in Example 1 was repeated except that the amounts of the water dispersion liquid 1 (solid content: 22% by mass) obtained in Preparation Example 1, propylene glycol available from FUJIFILM Wako Pure Chemical Corporation and ion-exchanged water used therein were changed to 12.41 g, 41.25 g and 36.29 g, respectively, thereby obtaining a water-based ink.

Example 4 (Production of Water-Based Ink)

The same procedure as in Example 1 was repeated except that the water dispersion liquid 1 (solid content: 22% by mass) obtained in Preparation Example 1 was replaced with 34.33 g of the water dispersion liquid 5 (solid content: 22% by mass) obtained in Preparation Example 5, and the amounts of propylene glycol available from FUJIFILM Wako Pure Chemical Corporation and ion-exchanged water used therein were changed to 36.00 g and 19.62 g, respectively, thereby obtaining a water-based ink.

Comparative Example 1 (Production of Water-Based Ink)

The same procedure as in Example 1 was repeated except that the water dispersion liquid 1 (solid content: 22% by mass) obtained in Preparation Example 1 was replaced with the water dispersion liquid 4 (solid content: 22% by mass) obtained in Preparation Example 4, thereby obtaining a water-based ink. However, the resulting ink suffered from increased viscosity, and therefore was unsuitable for use in the practical applications.

Comparative Example 2 (Production of Water-Based Ink)

The same procedure as in Example 1 was repeated except that the water dispersion liquid 1 (solid content: 22% by mass) obtained in Preparation Example 1 was replaced with 27.27 g of the water dispersion liquid 6 (solid content: 22% by mass) obtained in Preparation Example 6, and the amount of ion-exchanged water used therein was changed to 25.18 g, thereby obtaining a water-based ink.

Comparative Example 3 (Production of Water-Based Ink)

The same procedure as in Example 1 was repeated except that the water dispersion liquid 1 (solid content: 22% by mass) obtained in Preparation Example 1 was replaced with 38.07 g of the water dispersion liquid 7 (solid content: 22% by mass) obtained in Preparation Example 7, and the amounts of propylene glycol available from FUJIFILM Wako Pure Chemical Corporation and ion-exchanged water used therein were changed to 35.30 g and 14.58 g, respectively, thereby obtaining a water-based ink.

Comparative Example 4 (Production of Water-Based Ink)

The same procedure as in Example 1 was repeated except that the water dispersion liquid 1 (solid content: 22% by mass) obtained in Preparation Example 1 was replaced with 25.05 g of the water dispersion liquid 8 (solid content: 22% by mass) obtained in Preparation Example 8, and the amount of ion-exchanged water used therein was changed to 24.90 g, thereby obtaining a water-based ink. However, the resulting ink suffered from increased viscosity, and therefore was unsuitable for use in the practical applications.

Reference Example 1 (Production of Water-Based Ink)

The same procedure as in Example 1 was repeated except that the water dispersion liquid 1 (solid content: 22% by mass) obtained in Preparation Example 1 was replaced with the water dispersion liquid 3 (solid content: 22% by mass) obtained in Preparation Example 3, thereby obtaining a water-based ink.

Reference Example 2 (Production of Water-Based Ink)

The same procedure as in Preparation Example 3 was repeated except for using no crosslinking agent, thereby obtaining a water dispersion liquid. Using the thus obtained water dispersion liquid, the same procedure as in Example 1 was conducted to obtain a water-based ink.

<Preparation of Water-Based Inks and Evaluation Test for Water-Based Inks>
(Preparation of Water-Based Inks)
Using the respective water-based inks obtained in the aforementioned Examples, Comparative Examples and Reference Examples, the following evaluation tests were conducted. The results are shown in Table 2.
(Evaluation Tests for Water-Based Inks)
(1) Evaluation of Storage Stability
The water-based ink was filled in a hermetically sealed glass container, and stored therein by allowing the ink to stand at 70° C. for 28 days. The dispersion liquid after being thus stored was used as a test sample to measure a viscosity thereof before and after being stored, by the following method.

(Measurement of Viscosity)

The viscosity of the water-based ink was measured at 32° C. for 1 minute using an E-type viscometer "RE80L" available from Toki Sangyo Co., Ltd., equipped with a standard rotor (1°34'×R24). The rotating speed of the viscometer was adjusted to a highest speed among the measurable speeds thereof, but controlled to 100 rpm at the maximum.

(Measurement of Rate of Change in Viscosity)

Next, the rate (%) of change in viscosity of the water-based ink was calculated according to the following formula to evaluate storage stability of the water-based ink.

Rate (%) of Change in Viscosity=(Viscosity of Water-Based Ink After Being Stored/Viscosity of Water-Based Ink Before Being Stored)×100

As the rate of change in viscosity of the water-based ink is closer to 100%, the storage stability of the water-based ink becomes higher.

(2) Evaluation of Maintenanceability of Water-Based Ink

The initial weight absorbance of the water-based ink and the weight absorbance of the water-based ink after being redispersed were measured by the following method to calculate a rate of redispersion of the water-based ink according to the following formula. As the rate of redispersion of the water-based ink is closer to 100%, the maintenanceability of the water-based ink became higher.

Rate (%) of Redispersion of Ink=[(initial weight absorbance)/(weight absorbance after being redispersed)]×100

(i) Measurement of Initial Weight Absorbance

The water-based ink was diluted 2500 times with ion-exchanged water, and the weight absorbance of the thus diluted ink was measured in the range of an absorption wavelength of 400 to 600 nm using a spectrophotometer "Model No.: U-3010" available from Hitachi Ltd. The initial weight absorbance of the water-based ink was calculated from the absorbance at the maximum absorption wavelength within the measuring range according to the following formula.

Initial Weight Absorbance=[(absorbance at maximum absorption wavelength)×2500]/(concentration of pigment in water-based ink)

(ii) Measurement of Weight Absorbance After Being Redispersed

The water-based ink was weighed and charged in an amount of 0.03 g in a 6 mL glass petri dish, and dried at 40° C. under 20% RH for 90 minutes. The resulting dried product was mixed with 5 mL of ion-exchanged water, and the obtained mixture was shaken and redispersed at 100 rpm for 1 minute. The supernatant liquid separated from the mixture was diluted 50 times with ion-exchanged water, and the weight absorbance of the thus diluted ink was measured in the range of an absorption wavelength of 400 to 600 nm using a spectrophotometer "Model No.: U-3010" available from Hitachi Ltd.

The "weight absorbance of the water-based ink after being redispersed" was calculated from the absorbance at the maximum absorption wavelength within the measuring range according to the following formula.

Weight Absorbance After Being Redispersed=[(absorbance at maximum absorption wavelength)×(5/0.03)×50)]/(concentration of pigment in water-based ink)

(3) Evaluation of Optical Density

Using the water-based ink, image printing was conducted on a plain paper "4200" (water absorption: 14.0 g/m$^2$) available from Fuji Xerox Co., Ltd., by the following ink-jet printing method to evaluate optical density of the water-based ink upon printing.

(Ink-Jet Printing Method)

Under the environmental conditions of a temperature of 25±1° C. and a relative humidity of 30±5%, the water-based ink was loaded into a print evaluation apparatus available from Trytech Co., Ltd., equipped with an ink-jet print head "KJ4B-HD06MHG-STDV" (piezoelectric type) available from Kyocera Corporation. The operating conditions of the print evaluation apparatus were set to an applied head voltage of 26 V, a frequency of 20 kHz, an ejected ink droplet amount of 11 pL, a head temperature of 32° C., a resolution of 600 dpi, the number of ink shots for flushing before being ejected of 200 shots and a negative pressure of −4.0 kPa, and the printing medium was fixed on a transportation table by vacuum such that the longitudinal direction of the printing medium was aligned with a transportation direction thereof. A printing command was transmitted to the aforementioned print evaluation apparatus to print a Duty 100% image on the printing medium. The resulting printed material was allowed to stand for one day, and then subjected to measurement of optical density at optional 10 positions thereof using an optical densitometer "Spectro-Eye" available from GretagMacbeth AG to calculate an average of the measured values.

(4) Evaluation of Heat Resistance

After allowing the printed material prepared in the aforementioned item "(3) Evaluation of Optical Density" to stand for one day, coordinate values L*, a* and b* in L*, a*, b* color specification system were measured at optional 10 positions on the printed material using an optical densitometer "SpectroEye" available from GretagMacbeth AG to calculate an average of the measured values. Then, the printed material was heated at 150° C. for 2 hours using a dryer, and then coordinate values L*, a* and b* of the thus heated printed material were measured by the same method as described above. The color difference ΔE* defined by the values ΔL*, Δa* and Δb* which represent the differences between the coordinate values before and after the heat treatment of L*, a* and b*, respectively, was calculated according to the following formula to evaluate heat resistance of the water-based ink.

$$\Delta E^* = [(\Delta L^*)^2 + (\Delta a^*)^2 + (\Delta b^*)^2]^{0.5}$$

The smaller the ΔE* value is, the more excellent the heat resistance of the water-based ink becomes.

TABLE 2

| | Ink composition (% by mass) | | | | | | |
|---|---|---|---|---|---|---|---|
| | Pigment (A) | | Polymer B | | Ratio | Neutralizing agent | Compound (c) |
| | Kind | (%) | Kind | (%) | [(A)/(B)] | Kind | Kind |
| Example 1 | PY150 | 4.5 | B1 | 1.6 | 2.8 | NaOH NH$_3$ | C1 |
| Example 2 | PY150 | 4.5 | B2 | 1.6 | 2.8 | NaOH | C1 |
| Example 3 | PY150 | 2.0 | B1 | 0.7 | 2.9 | NaOH NH$_3$ | C1 |
| Example 4 | PY150 | 4.5 | B1 | 3.1 | 1.6 | NaOH NH$_3$ | C1 |
| Comparative Example 1 | PY150 | 4.5 | B3 | 1.6 | 2.8 | NaOH | C1 |
| Comparative Example 2 | PY150 | 4.5 | B1 | 1.5 | 3.0 | NaOH NH$_3$ | — |
| Comparative Example 3 | PY150 | 4.5 | B1 | 3.9 | 1.2 | NaOH NH$_3$ | C1 |
| Comparative Example 4 | PY150 | 4.5 | B1 | 1.0 | 4.5 | NaOH NH$_3$ | C1 |
| Reference Example 1 | PY74 | 4.5 | B1 | 1.6 | 2.8 | NaOH NH$_3$ | C1 |
| Reference Example 2 | PY74 | 4.5 | B1 | 1.5 | 3.0 | NaOH NH$_3$ | — |

| | Ink composition (% by mass) | | | Evaluation of ink | | | Evaluation of printed material | |
|---|---|---|---|---|---|---|---|---|
| | Organic solvent (D) | | Water | Average particle size | Storage stability | Maintenance-ability | Optical density | Heat resistance |
| | Kind | (%) | (%) | (nm) | (%) | % | | ($\Delta$E*) |
| Example 1 | PG DEG | 37.5 10 | 46.4 | 106 | 101 | 80 | 1.03 | 3.1 |
| Example 2 | PG DEG | 43.0 0 | 50.9 | 98 | 105 | 95 | 1.05 | 3.2 |
| Example 3 | PG DEG | 41.3 10 | 46.0 | 105 | 101 | 88 | 0.62 | 3.3 |
| Example 4 | PG DEG | 36.0 10 | 46.4 | 115 | 95 | 56 | 1.04 | 3.3 |
| Comparative Example 1 | PG DEG | 37.5 10 | 46.4 | increased viscosity | — | — | — | — |
| Comparative Example 2 | PG DEG | 37.5 10 | 46.5 | 110 | 160 | 25 | 1.04 | 3.3 |
| Comparative Example 3 | PG DEG | 35.2 10 | 46.4 | 121 | 98 | 31 | 0.99 | 3.3 |
| Comparative Example 4 | PG DEG | 38.1 10 | 46.4 | increased viscosity | — | — | — | — |
| Reference Example 1 | PG DEG | 37.5 10 | 46.4 | 115 | 106 | 82 | 1.13 | 5.0 |
| Reference Example 2 | PG DEG | 37.5 10 | 46.5 | 112 | 143 | 75 | 1.14 | 5.1 |

Note
B1: Mass ratio: styrene/styrene macromer/methacrylic acid/M · 40G = 44/15/16/25; acid value: 104 mg KOH/g
B2: Mass ratio: styrene/α-methyl styrene/acrylic acid = 54/4/42; acid value: 327 mg KOH/g
B3: Mass ratio: styrene/α-methyl styrene/acrylic acid = 87/4/9; acid value: 70 mg KOH/g
C1: Trimethylolpropane polyglycidyl ether From Table 2, it was confirmed that the water-based inks obtained in Examples 1 to 4 were excellent in storage stability and maintenanceability as compared to the water-based inks obtained in Comparative Examples 1 to 4.

In Reference Examples 1 and 2 in which C.I. Pigment Yellow 74 was used as the pigment, the water-based inks obtained therein were excellent in maintenanceability irrespective of presence or absence of a crosslinked product of the polymer (B) [compound (c)]. It was also confirmed that the water-based ink obtained in Reference Example 1 was more excellent in storage stability than the water-based ink obtained in Comparative Example 1, and the water-based ink obtained in Reference Example 2 was also more excellent in storage stability than the water-based ink obtained in Comparative Example 2. Meanwhile, the difference in values of the content of the polymer (B) and the mass ratio [(A)/(B)] between Reference Examples 1 and 2 was due to the difference in the amount of the crosslinking agent [compound (c)] used therebetween.

The invention claimed is:
1. A water-based ink comprising an azomethine metal complex pigment (A), an aromatic group-containing polymer (B), an organic solvent (D) and water, in which:
   a mass ratio of the azomethine metal complex pigment (A) to the aromatic group-containing polymer (B) [(A)/(B)] is not less than 1.4 and not more than 3.2; and
   the aromatic group-containing polymer (B) is a crosslinked polymer obtained by crosslinking an aromatic group-containing polymer (b) having an acid value of not less than 80 mgKOH/g and not more than 400 mgKOH/g with a water-insoluble polyfunctional epoxy compound (c), the azomethine metal complex pigment (A) is a metal complex pigment comprising an azomethine compound as a ligand and a divalent or trivalent ion of a metal selected from the group consisting of Fe, Co, Ni and Zn, a boiling point of the organic solvent (D) is not lower than 90° C. and not higher than 250° C., and a content of the organic solvent (D) in the water-based ink is not less than 20% by mass and not more than 70% by mass.

2. The water-based ink according to claim 1 wherein the azomethine metal complex pigment (A) is a metal complex pigment having a structure represented by the following general formula (2) or a tautomer thereof:

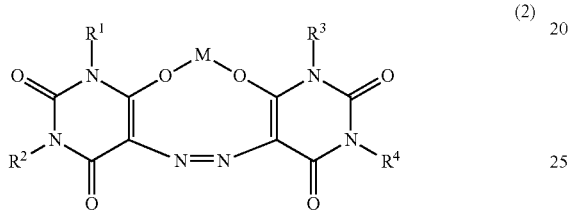

(2)

wherein M is a divalent or trivalent ion of a metal selected from the group consisting of Fe, Co, Ni and Zn; and $R^1$ to $R^4$ are each independently a hydrogen atom, a monovalent hydrocarbon group having 1 to 5 carbon atoms, or a —$SO_3H$ group.

3. The water-based ink according to claim 1, wherein the azomethine metal complex pigment (A) is C.I. Pigment Yellow 150.

4. The water-based ink according to claim 1, wherein a content of the azomethine metal complex pigment (A) in the water-based ink is not less than 2% by mass.

5. The water-based ink according to any claim 1, wherein the azomethine metal complex pigment (A) is in the form of water-insoluble polymer particles obtained by allowing the aromatic group-containing polymer (B) to adhere onto a surface of the pigment (A).

6. The water-based ink according to claim 1, wherein the water-insoluble polyfunctional epoxy compound (c) is a glycidyl ether compound of a polyhydric alcohol comprising a hydrocarbon group having not less than 3 and not more than 8 carbon atoms.

7. The water-based ink according to claim 1, wherein a content of an organic solvent having a boiling point of higher than 250° C. in the organic solvent (D) is less than 10% by mass.

8. The water-based ink according to claim 1, wherein the aromatic group-containing polymer (b) comprises a constitutional unit derived from an aromatic group-containing monomer and a constitutional unit derived from a carboxy group-containing vinyl monomer.

9. The water-based ink according to claim 8, wherein the aromatic group-containing polymer (b) further comprises a constitutional unit derived from a nonionic monomer.

10. The water-based ink according to claim 1, wherein the aromatic group-containing polymer (b) comprises a constitutional unit derived from a styrene-based monomer and a constitutional unit derived from at least one monomer selected from the group consisting of acrylic acid and methacrylic acid.

11. The water-based ink according to claim 1, wherein the organic solvent (D) comprises a polyhydric alcohol.

12. The water-based ink according to claim 11, wherein the polyhydric alcohol comprises at least one selected from the group consisting of propylene glycol and diethylene glycol.

13. The water-based ink according to claim 1 for ink-jet printing.

14. A process for producing a pigment water dispersion liquid of particles of an aromatic group-containing polymer (B) comprising an azomethine metal complex pigment (A), said process comprising the following steps 1 and 3:

Step 1: subjecting a mixture comprising the azomethine metal complex pigment (A), an aromatic group-containing polymer (b) having an acid value of not less than 80 mgKOH/g and not more than 400 mgKOH/g and water to dispersion treatment to obtain a pigment water dispersion liquid; and Step 3: subjecting the pigment water dispersion liquid obtained in the step 1 to crosslinking treatment with a water-insoluble polyfunctional epoxy compound (c) to obtain a pigment water dispersion liquid B in which the azomethine metal complex pigment (A) is incorporated in the aromatic group-containing polymer (B) obtained by the crosslinking treatment.

* * * * *